US012560218B2

(12) United States Patent
Estridge

(10) Patent No.: US 12,560,218 B2
(45) Date of Patent: Feb. 24, 2026

(54) SHOCK ISOLATOR FOR NON HARDENED SYSTEMS

(71) Applicant: BAE Systems Information and Electronic Systems Integration Inc., Nashua, NH (US)

(72) Inventor: Michael R. Estridge, Austin, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 435 days.

(21) Appl. No.: 18/312,350

(22) Filed: May 4, 2023

(65) Prior Publication Data

US 2024/0369125 A1 Nov. 7, 2024

(51) Int. Cl.
F16F 15/02 (2006.01)

(52) U.S. Cl.
CPC ...... F16F 15/02 (2013.01); *F16F 2230/0005* (2013.01); *F16F 2232/06* (2013.01)

(58) Field of Classification Search
CPC ........ F16F 15/02; F16F 15/021; F16F 15/022; F16F 2230/0005; F16F 2232/06; E04H 9/0235
See application file for complete search history.

(56) References Cited

U.S. PATENT DOCUMENTS 4,362,287 A 12/1982 Grongstad
5,310,157 A * 5/1994 Platus ................... F16F 15/073
248/619

5,595,430 A * 1/1997 Weyeneth .............. G11B 33/08
312/319.1
6,962,830 B1 11/2005 Behin et al.
6,983,924 B2 * 1/2006 Howell ................... F16F 3/026
251/118
8,714,324 B2 * 5/2014 Shimoda ............... F16F 15/035
188/380

(Continued)

FOREIGN PATENT DOCUMENTS

EP 2940346 11/2015
GB 2464618 4/2010

(Continued)

OTHER PUBLICATIONS

Not yet published PCT Application No. PCT/US2021/060433, filed Nov. 23, 2021, titled Methods for Ballistic Shock Isolation of Non Hardened Camera Systems, Applicant—BAE Systems Information and Electronic Systems Integration Inc.

(Continued)

*Primary Examiner* — Thomas W Irvin
(74) *Attorney, Agent, or Firm* — Sand, Sebolt & Wernow LPA; Gary McFaline

(57) ABSTRACT

A shock absorbing apparatus that includes a baseplate adapted to be mounted on a platform, a flexure member that operably engages with the baseplate, and a mounting plate that operably engages with the flexure member. The mounting plate is free from direct engagement with the baseplate and is moveable between a neutral position and a translated position with respect to the baseplate. The mounting plate is also adapted to hold a device. The flexure member is adapted to absorb shock forces caused by a ballistic shock event or a projectile motion event in proximity to or applied on the platform.

18 Claims, 15 Drawing Sheets

(56)      References Cited

U.S. PATENT DOCUMENTS

| | | | | |
|---|---|---|---|---|
| 9,302,623 | B2 * | 4/2016 | Melcher | F16F 15/022 |
| 10,041,622 | B2 * | 8/2018 | Bullard | F16F 15/046 |
| 10,125,843 | B2 * | 11/2018 | Runge | F16F 15/073 |
| 10,167,652 | B2 * | 1/2019 | Nakakubo | F16F 15/067 |
| 11,808,319 | B2 * | 11/2023 | Pu | F16F 15/02 |
| 11,981,267 | B2 * | 5/2024 | Dube | F16F 9/34 |
| 12,151,378 | B2 * | 11/2024 | Binnard | B25J 9/144 |
| 2004/0021123 | A1 * | 2/2004 | Howell | F16F 1/027 |
| | | | | 251/337 |
| 2007/0051576 | A1 * | 3/2007 | Shimoda | F16F 15/073 |
| | | | | 188/380 |
| 2013/0328337 | A1 * | 12/2013 | Melcher | B60R 1/076 |
| | | | | 248/560 |
| 2018/0112737 | A1 * | 4/2018 | Runge | F16F 15/046 |
| 2018/0119444 | A1 * | 5/2018 | Casa | E04H 9/023 |
| 2018/0128418 | A1 * | 5/2018 | Bullard | F16F 1/025 |
| 2018/0216359 | A1 * | 8/2018 | Nakakubo | F16F 15/067 |
| 2018/0370602 | A1 | 12/2018 | Norrman | |
| 2020/0064106 | A1 | 2/2020 | Tervola et al. | |
| 2022/0042340 | A1 | 2/2022 | Allen | |
| 2022/0243782 | A1 * | 8/2022 | Pu | F16F 15/02 |
| 2023/0158969 | A1 * | 5/2023 | Dube | F16F 13/007 |
| | | | | 267/137 |

FOREIGN PATENT DOCUMENTS

| | | |
|---|---|---|
| GB | 2515885 | 1/2015 |
| GB | 2567500 | 4/2019 |
| KR | 102138586 | 7/2020 |
| WO | 2013115880 | 8/2013 |
| WO | 2014007663 | 1/2014 |
| WO | 2021232159 | 11/2021 |
| WO | 2021256919 | 12/2021 |

OTHER PUBLICATIONS

International Search Report; PCT/US2021/060433, filed Nov. 23, 2021, titled Methods for Ballistic Shock Isolation of Non Hardened Camera Systems, Applicant—BAE Systems Information and Electronic Systems Integration Inc.

* cited by examiner

SHOCK ISOLATOR FOR NON HARDENED SYSTEMS

TECHNICAL FIELD

This disclosure is directed to a shock absorbing apparatus and more particularly a shock absorbing apparatus and system for dampening and reducing ballistic shock to a device, such as an optical instrument.

BACKGROUND ART

Ballistic shock may refer to a high-level shock that generally results from an impact of projectiles or ordnance on or near military platforms, such as armored combat vehicles. Military platforms should ideally be able to withstand the ballistic shocks caused by ballistic shock events that occur within proximity to the platform, while still maintaining their combat mission capabilities. As such, components and assemblies provided on the military platforms should also ideally be able to withstand effects of such ballistic shocks.

For example, military platforms may include devices or other apparatus, such as optical instruments, devices, and/or systems (e.g., camera systems). However, many optical instruments are incapable of withstanding ballistic shock caused by ballistic shock events such as large caliber projectiles, mine blasts, overhead artillery attacks, and other ballistic shock events. For instance, optical systems used during military operations should be capable of withstanding high-level shock from ballistic shock events while continuing to operate as intended during the course of the military operations. Such optical systems should ideally comply with shock requirements to prevent damage to internal components (e.g., electronic, mechanical, and electro-mechanical systems, components and devices such as electronic circuit card assemblies, optics, and other components of optical instruments).

Mechanical apparatuses and systems may be used to provide a measure of ballistic shock resistance, but known systems may suffer from a variety of issues. Accordingly, it would be desirable to provide an improved mechanical apparatus and system to help reduce the effects of ballistic shock events in proximity to military platforms and provide improved ballistic shock resistance.

SUMMARY OF THE INVENTION

In one aspect, an exemplary embodiment of the present disclosure may provide a shock absorbing apparatus. The shock absorbing apparatus includes a baseplate adapted to be mounted on a platform. The shock absorbing apparatus also includes a flexure member that operably engages with the baseplate. The shock absorbing apparatus also includes a mounting plate that operably engages with the flexure member, wherein the mounting plate is free from direct engagement with the baseplate and moveable between a neutral position and a translated position with respect to the baseplate, and wherein the mounting plate is adapted to hold a device. The flexure member is adapted to absorb ballistic shock forces caused by a ballistic shock event in proximity to or applied on the platform.

This exemplary embodiment or another exemplary embodiment may further include that the flexure member is configured to rotationally flex in a first rotational direction and a second rotational direction to absorb ballistic shock forces caused by the ballistic shock event. This exemplary embodiment or another exemplary embodiment may further include that the flexure member comprises: a central section; a set of arms extending outwardly from the central section; and a set of extended members extending outwardly from the set of arms; wherein the set of extended members operably engages with the mounting plate and is spaced apart from the baseplate. This exemplary embodiment or another exemplary embodiment may further include that the flexure member further comprises: a top surface of the central section spaced apart from the mounting plate; a bottom surface of the central section vertically opposite to the top surface and that operably engages with the baseplate; and a central axis defined between the top surface and the bottom surface; wherein the set of arms rotatably flexes between the neutral position and the transition position to absorb ballistic shock forces applied on the mounting plate and the device caused by the ballistic shock event. This exemplary embodiment or another exemplary embodiment may further include that each arm of the set of arms comprises: a first end operably engaging with the central section; a second end opposite to the first end and configured to engage with an extended member of the set of extended members; and a curved portion extending longitudinally between the first end and the second end; wherein the curved portion rotatably flexes between the neutral position and the transition position to absorb ballistic shock forces applied on the mounting plate and the device caused by the ballistic shock event. This exemplary embodiment or another exemplary embodiment may further include a first set of retaining members that operably engages with the baseplate and interfaces with the flexure member for maintaining the flexure member, the mounting plate, and the device in the neutral position in absence of the ballistic shock event. This exemplary embodiment or another exemplary embodiment may further include that the mounting plate comprises: a top surface; a bottom surface directly opposite to the top surface; a set of first set of interior walls extending upwardly from the bottom surface towards the top surface and defining lower annular recesses; and a set of second interior walls extending upwardly from the set of first interior walls towards the top surface and defining upper chambers; wherein each retaining member of the first set of retaining members is configured to slidably engage with the set of first interior walls for enabling the mounting plate to move between the neutral position and the translated position. This exemplary embodiment or another exemplary embodiment may further include that each retaining member of the first set of retaining members comprises: a ball detent that operably engages with the mounting plate; and a spring plunger that interfaces with the ball detent and operably engages with the baseplate; wherein ball detent is moveable relative to the spring plunger between a first position and a second position for enabling the mounting plate to move between the neutral position and the translated position. This exemplary embodiment or another exemplary embodiment may further include that each retaining member of the first set of retaining members further comprises: a terminal end of the ball detent; wherein when the mounting plate is in the neutral position, the terminal end of the ball detent operably engages with the mounting plate and partially positioned inside of an upper chamber of the set of upper chambers; and wherein when the mounting plate is in the translated position, the terminal end of the ball detent operably engages with the mounting plate external to the upper chamber of the set of upper chambers. This exemplary embodiment or another exemplary embodiment may further include a central retaining member that operably engages with the flexure member and interfaces with the mounting plate to maintain the mounting plate and the device in the neutral position in absence of the ballistic shock event. This exemplary embodiment or another exemplary embodiment may further include that the central retaining member comprises: a ball detent that operably engages with the mounting plate; and a spring plunger that interfaces with the ball detent and operably engages with the baseplate; wherein ball detent is moveable relative to the spring plunger between a first position and a second position for enabling the mounting plate to move between the neutral position and the translated position. This exemplary embodiment or another exemplary embodiment may further include that the central retaining member further comprises: a terminal end of the ball detent; wherein when the mounting plate is in the neutral position, the terminal end of the ball detent operably engages with the mounting plate and partially positioned inside of an upper chamber of the set of upper chambers; and wherein when the mounting plate is in the translated position, the terminal end of the ball detent operably engages with the mounting plate external to the upper chamber of the set of upper chambers. This exemplary embodiment or another exemplary embodiment may further include a shroud operably engaged with the baseplate and the mounting plate to protect the flexure member from external elements surrounding the shock absorbing apparatus and the platform, wherein the shroud includes folds between an upper surface of the shroud and a lower surface of the shroud. This exemplary embodiment or another exemplary embodiment may further include a shielding operably engaged with mounting plate and encapsulating the device on the mounting plate.

In another aspect, an exemplary embodiment of the present disclosure may provide a method. The method comprises steps of providing a shock absorbing apparatus, wherein the shock absorbing apparatus comprises: a baseplate; a flexure member operably engaging with the baseplate; and a mounting plate operably engaging with the flexure member, wherein the mounting plate is free from engagement with the baseplate and moveable between a neutral position and a translated position with respect to the baseplate; effecting the baseplate, the flexure member, the mounting plate, and a device operably engaged with the mounting plate to be mounted to a platform; effecting a first dampening force to be exerted on the mounting plate and the device, via the flexure member, in a first direction in response to a ballistic event; effecting an opposing second dampening force to be exerted on the mounting plate and the device, via the flexure member, in an opposing second direction; and effecting the mounting plate and the device to be maintained at a neutral position subsequent to the ballistic event.

This exemplary embodiment or another exemplary embodiment may further include that the step of effecting a first absorbing force to be exerted on the mounting plate and the device via the flexure member further comprises: rotating the flexure member in a first rotational direction from the neutral position to the translated position in response to the ballistic event. This exemplary embodiment or another exemplary embodiment may further include that the step of effecting a second absorbing force to be exerted on the mounting plate and the device via the flexure member further comprises: rotating the flexure member in a second rotational direction from the translated position to the neutral position in response to the ballistic event. This exemplary embodiment or another exemplary embodiment may further include steps of engaging a spring plunger of each retaining member of a set of retaining members of the shock absorbing apparatus with the baseplate; and engaging a ball detent of each retaining member of the set of retaining members with the mounting plate inside a set of engagement cavities defined by mounting plate without a response to the ballistic event; wherein the mounting plate is maintained at the neutral position. This exemplary embodiment or another exemplary embodiment may further include a step of disengaging the ball detent of each retaining member of the set of retaining members from the mounting plate outside of the set of engagement cavities in response to the ballistic event; wherein the mounting plate translates from the neutral position to the translated position. This exemplary embodiment or another exemplary embodiment may further include steps of engaging a shroud of the shock absorbing apparatus with the baseplate and the mounting plate; and engaging a shielding of the shock absorbing apparatus with the mounting plate; wherein the shroud protects the flexure member from external elements surrounding the shock absorbing apparatus; wherein the shielding protects the device on the mounting plate.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
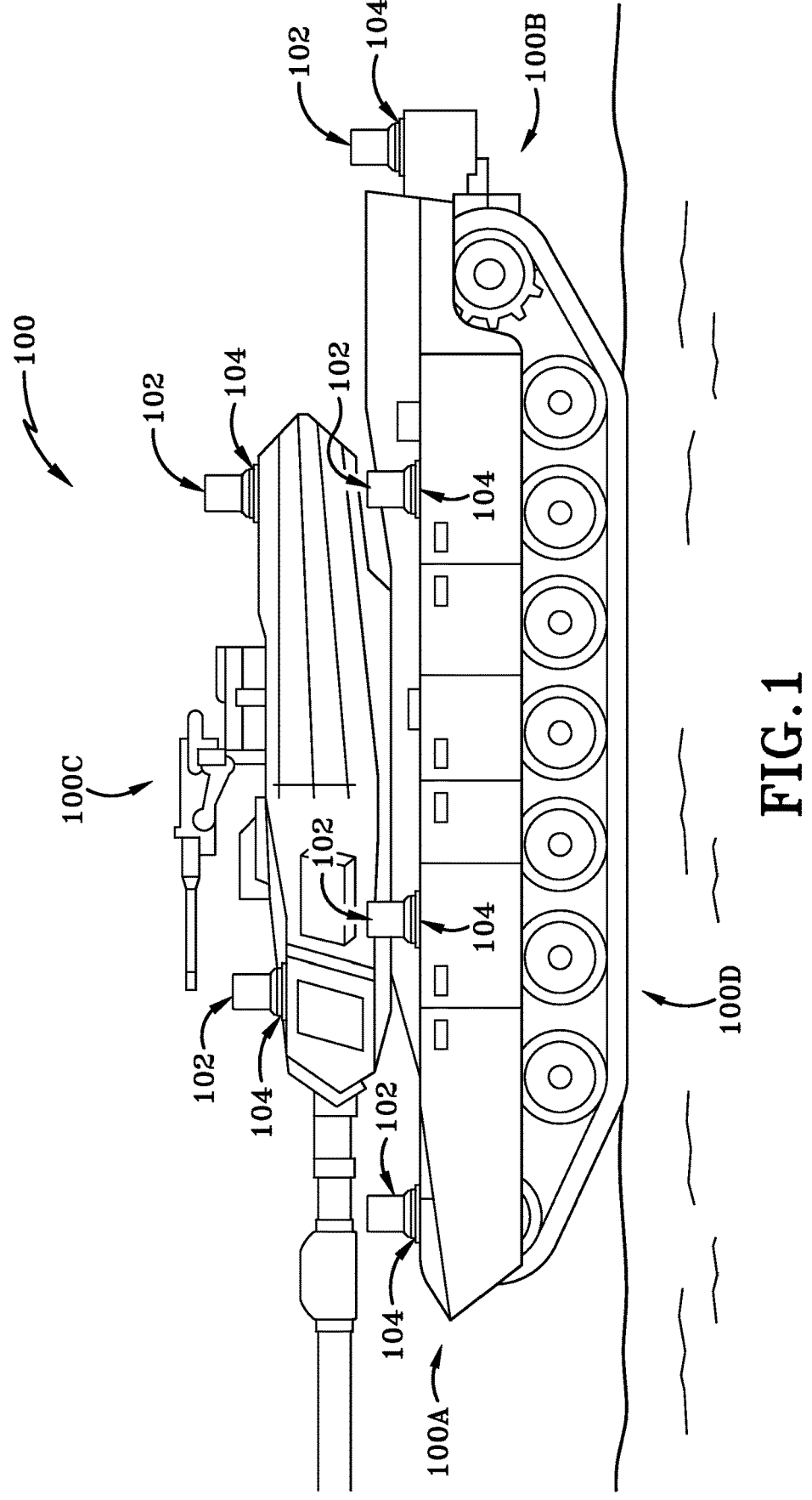
FIG. 1 is a diagrammatic view showing a military platform operably engaged with a plurality of shock absorbing apparatuses in accordance with an aspect of the present disclosure, wherein each shock absorbing apparatus of the plurality of shock absorbing apparatuses is capable of housing a device.

FIG. 1 is a diagrammatic view showing a military platform 100 in accordance with an aspect of the present disclosure. Platform 100 may be any structure either mobile or stationary (e.g., platform 100 may be a platform capable of moving or a platform that remains stationary in a fixed position). In the specific example shown in FIG. 1 for purposes of illustration, platform 100 is a ground vehicle, and more specifically, a military ground vehicle. However, it should be appreciated that platform 100 may be any type of manned or unmanned structure and is not limited to being a vehicle, a ground vehicle or a military vehicle even though platform 100 may be any of those types of vehicles in some implementations. Additionally, while the particular non-limiting example of platform 100 that is illustrated in FIG. 1 is an armored tank vehicle, it should be appreciated that platform 100 could be any one of number of other types of ground-based vehicles used in a military context including light utility vehicles, light armored utility vehicles, armored combat support vehicles, armored personnel carrier vehicles, infantry fighting vehicles, main battle tank vehicles, or any other suitable type of platforms.

In some embodiments, platform 100 may be a vehicle such as a ground-based vehicle, an air-based vehicle (e.g., an airborne vehicle such as an aircraft, guided munition or drone), a water-based vehicle that may be used on or in a body of water (e.g., a watercraft such as a vessel, a boat, a ship, a submarine, etc.), a space-based vehicle (e.g., a spacecraft such as a rocket, satellite, etc.), etc. In other embodiments, platform 100 may be a stationary or fixed structure, such as a cell tower, building, bridge or other structure.

Referring to FIG. 1, platform 100 includes a front end 100A, an opposite rear end 100B, a top end 100C, an opposite bottom end 100D. It should be understood that the directions of "front," "rear," "top," "bottom," and other directional derivatives described herein are only used as directional references of platform 100, associated components and/or parts of platform 100, and other devices, instruments, or assembly positioned with platform 100 as may be described and illustrated herein. Such directional terminology used herein should not limit the description of platform 100 as well as components operably engaged with platform 100, particularly one or more shock absorbing apparatus (described in greater detail below).

Figure 11:
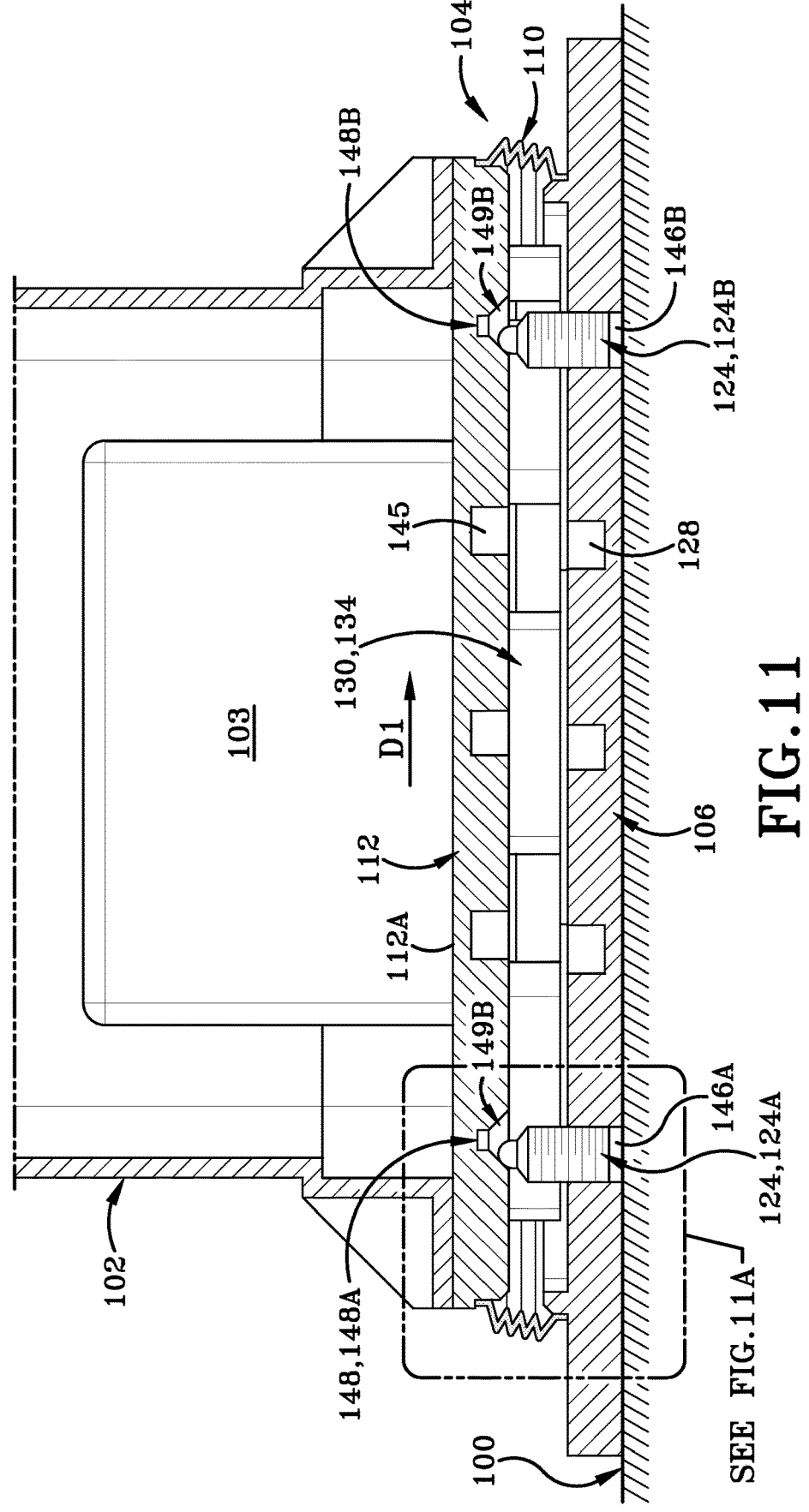
FIG. 11 is another operational view of shock absorbing apparatus, taken in the direction of line 11-11 in FIG. 10, as a device, the mounting plate, the shroud, and the flexure device of the shock absorbing apparatus collectively transition from the neutral positions to the translated positions.

Platform 100 may include a shielding 102 housing one or more sensitive devices 103 mounted thereon or therein (see FIG. 11). The shielding 102 may be coupled to platform 100 via a shock absorbing apparatus 104 for housing and protecting the one or more devices 103. In the present disclosure, the one or more devices 103 may be any electronic, mechanical, or electro-mechanical system, component and/or device that is capable of being used in conjunction with platform 100 (e.g., mounted in or on platform 100) to provide enhanced functionality. The type of device 103 can vary depending on the implementation.

In some embodiments, devices 103 may be instruments and/or apparatuses that are provided for use with platform 100 to sense the environment surrounding platform 100. In some cases, devices 103 may be used to provide assistance to an operator or driver of platform 100, for example, when operating, maneuvering and/or otherwise using platform 100 (e.g., during a military operation). One non-limiting example of such a device would be an optical device that helps someone view the environment in proximity to platform 100. In another instance, the one or more devices 103 may be an optical device that provides a driver or other occupant of platform 100 with a field of view (FOV) of an area around platform 100 (e.g., helps occupants of platform 100 such as a driver view the environment near or around the vehicle).

Operation or performance of each device 103 would typically be affected by ballistic shock events that occur in proximity to platform 100 or shock events that are generated by platform 100. To reduce the effects of ballistic shock events that occur in proximity of platform 100, the one or more devices 103 may be mounted on and operably engaged with a corresponding shock absorbing apparatus 104 coupled between platform 100 and shielding 102. Each shock absorbing apparatus 104 is configured to dampen and absorb ballistic shock forces experienced at the one or more device 103 as a result of ballistic shock events that occur in proximity to platform 100 (e.g., at or near platform 100). In other words, each shock absorbing apparatus 104 can dampen movement of the one or more devices 103 that would normally result from ballistic shock events that occur in proximity to platform 100 and thus reduce the impact of the ballistic shock forces experienced by shielding 102. Thus, utilizing shock absorbing apparatus 104 improves stability of the one or more devices 103 when subjected to ballistic shock events that occur in proximity to platform 100.

While platform 100 of FIG. 1 is illustrated as including six devices 103 mounted with six shock absorbing apparatuses 104, those skilled in the art will appreciate that platform 100 may include any suitable number of devices 103 and corresponding shock absorbing apparatuses 104.

Figures 4, 4A, 4B:
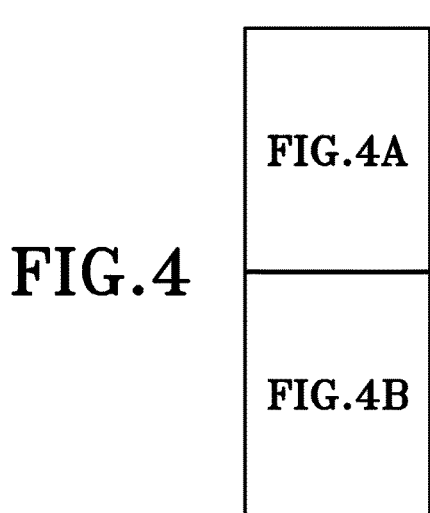
FIG. 4 is a diagrammatic chart showing the placement of a first set of parts of the shock absorbing apparatus shown in FIG. 4A with a second set of parts of the shock absorbing apparatus shown in FIG. 4B.
FIG. 4A is an exploded view of a mounting plate, a shroud, and a set of first fastening members of the shock absorbing apparatus.
FIG. 4B is an exploded view of a baseplate, a flexure member, a set of retaining members, and a set of second fastening members of the shock absorbing apparatus.
Figure 4B:
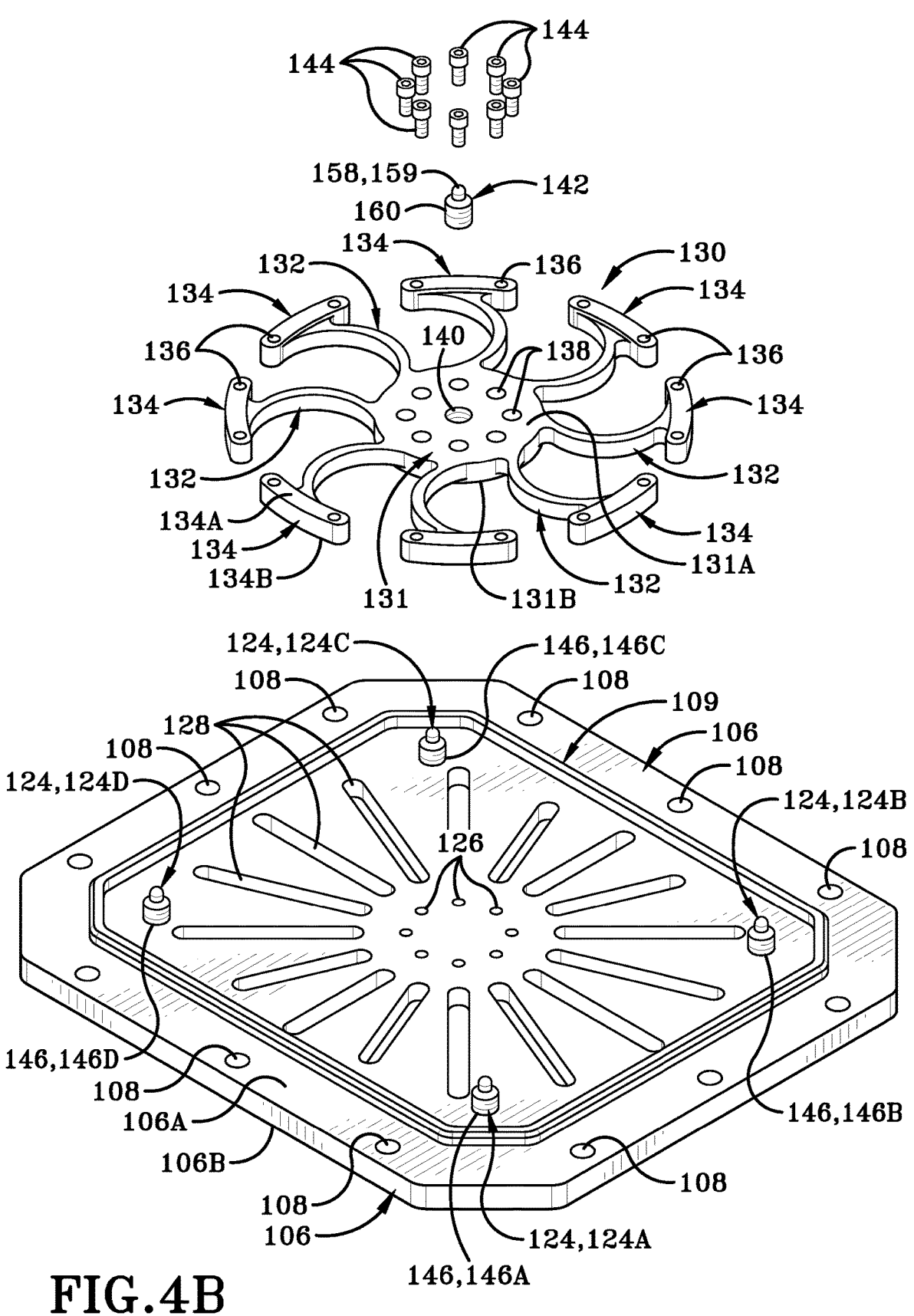

In the present disclosure, shock absorbing apparatus 104 includes a baseplate 106. As best seen in FIG. 4B, baseplate 106 may include a first or upper surface 106A that is spaced apart from the platform 100. Baseplate 106 may also include a second or lower surface 106B that is vertically opposite to the upper surface 106A and is operably engaged with the platform 100. Baseplate 106 may also define set of mounting openings 108 that extends vertically through baseplate 106 between the upper surface 106A and the lower surface 106B. It should be noted that upper surface 106A and lower surface 106B are in fluid communication with one another at each opening of the set of mounting openings 108. During assembly, baseplate 106 may be mounted on platform 100 via a fastening mechanism (not shown) that is inserted through the set of mounting openings 108. In one example, fastening mechanisms, such as bolts, may be used to engage baseplate 106 with the mounting openings 108 and corresponding slots of platform 100.

Baseplate 106 may also include an upright wall or mount 109. As best seen in FIG. 4B, the upright wall 109 extends upwardly from the upper surface 106A of baseplate 106 and is positioned interior of the set of mounting openings 108. As described in greater detail below, the upright wall 109 provides an attachment and/or locking capability between baseplate 106 and a shroud of shock absorbing apparatus 104 upon assembly of baseplate 106 and the shroud.

Figures 7, 7A:
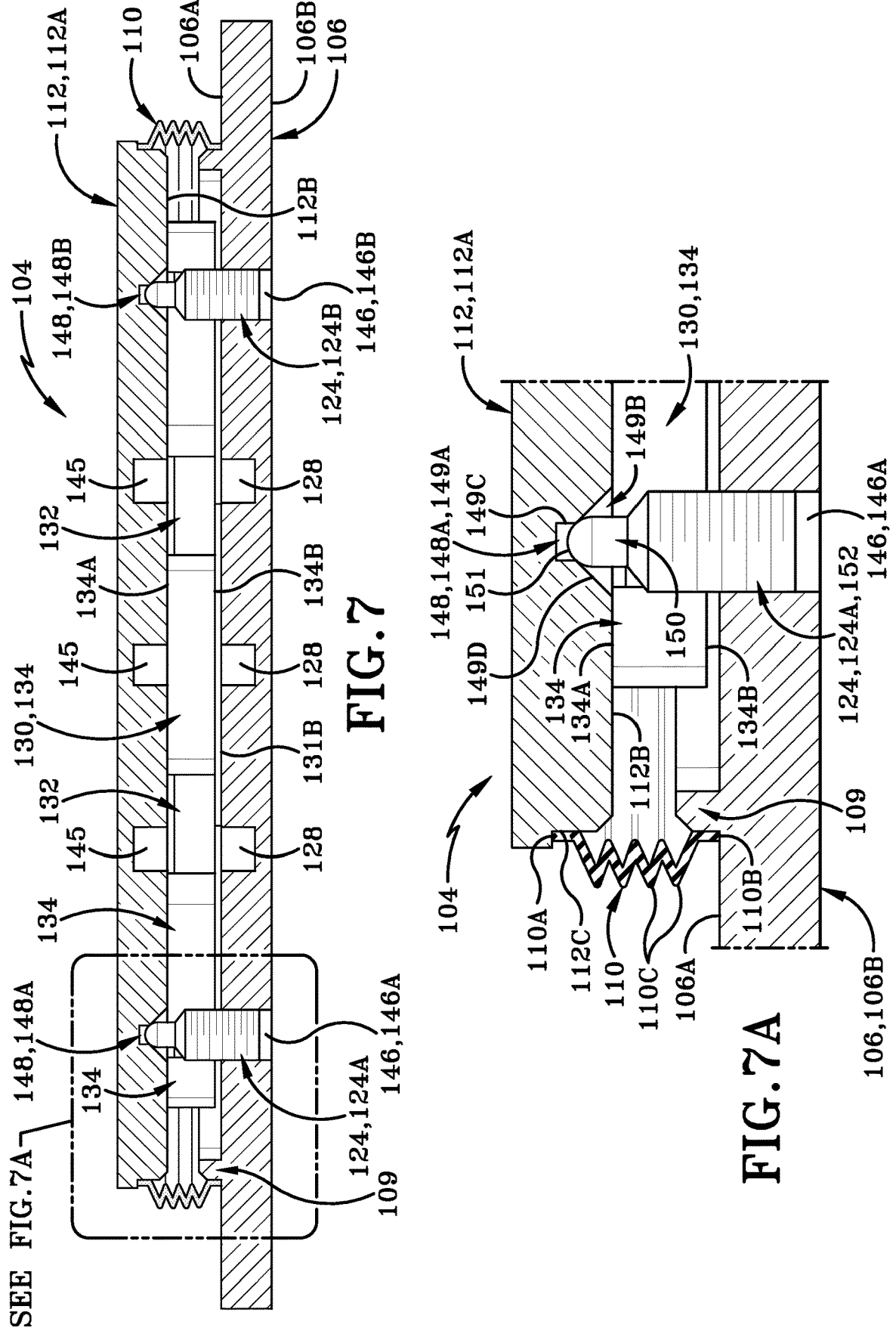
FIG. 7 is a cross-sectional view of the shock absorbing apparatus taken in the direction of line 7-7 in FIG. 6.
FIG. 7A is an enlarged view of the highlighted region shown in FIG. 7.

Shock absorbing apparatus 104 may also include a shroud 110 that operably engages with baseplate 106. As best seen in FIG. 4A, shroud 110 includes a top or upper end 110A, a bottom or lower end 110B directly opposite to the upper end 110A wherein the lower end 110B operably engages with baseplate 106, and a set of folds 110C layered between the upper end 110A and the lower end 110B. As best seen in FIG. 7A, the lower end 110B of shroud 110 operably engages with the upper surface 106A of baseplate 106 and the upright wall 109 inside of the set of ridges 109. In one exemplary embodiment, the lower end 110B of shroud 110 may be adhered to and/or affixed to the upper surface 106A of baseplate 106 and the upright wall 109 inside of the set of ridges 109. In another exemplary embodiment, the lower end 110B of shroud 110 may be frictionally fit to the upper surface 106A of baseplate 106 and the upright wall 109 inside of the set of ridges 109.

Shroud 110 may be provided to protect internal parts and/or components of shock absorbing apparatus 104 from external elements (e.g., dust, dirt, and other contaminants or obstructions) that might otherwise be introduced into the interior of shock absorbing apparatus 104 from the external environment surrounding platform 100. This way, external elements are not introduced inside the shock absorbing apparatus 104, where they could negatively impact parts of the shock absorbing apparatus 104 that are disposed inside the shock absorbing apparatus 104. For instance, shroud 110 may be used to prevent the introduction of dust, dirt, and other contaminants or obstructions from contacting or interacting with baseplate 106 and internal components of shock absorbing apparatus 104. Shroud 110 may otherwise be considered a seal or gasket having folds 110C.

Shroud 110 may be made from a flexible and/or resilient material that will not interfere with the motion of shielding 102 and a mounting plate (described below) of planar shock absorbing device 104 while still returning to its original shape after being subjected to ballistic shock events. In one embodiment, shroud 110 may be made from an elastomeric material of a rectangular structure or similar shape.

Figure 2:
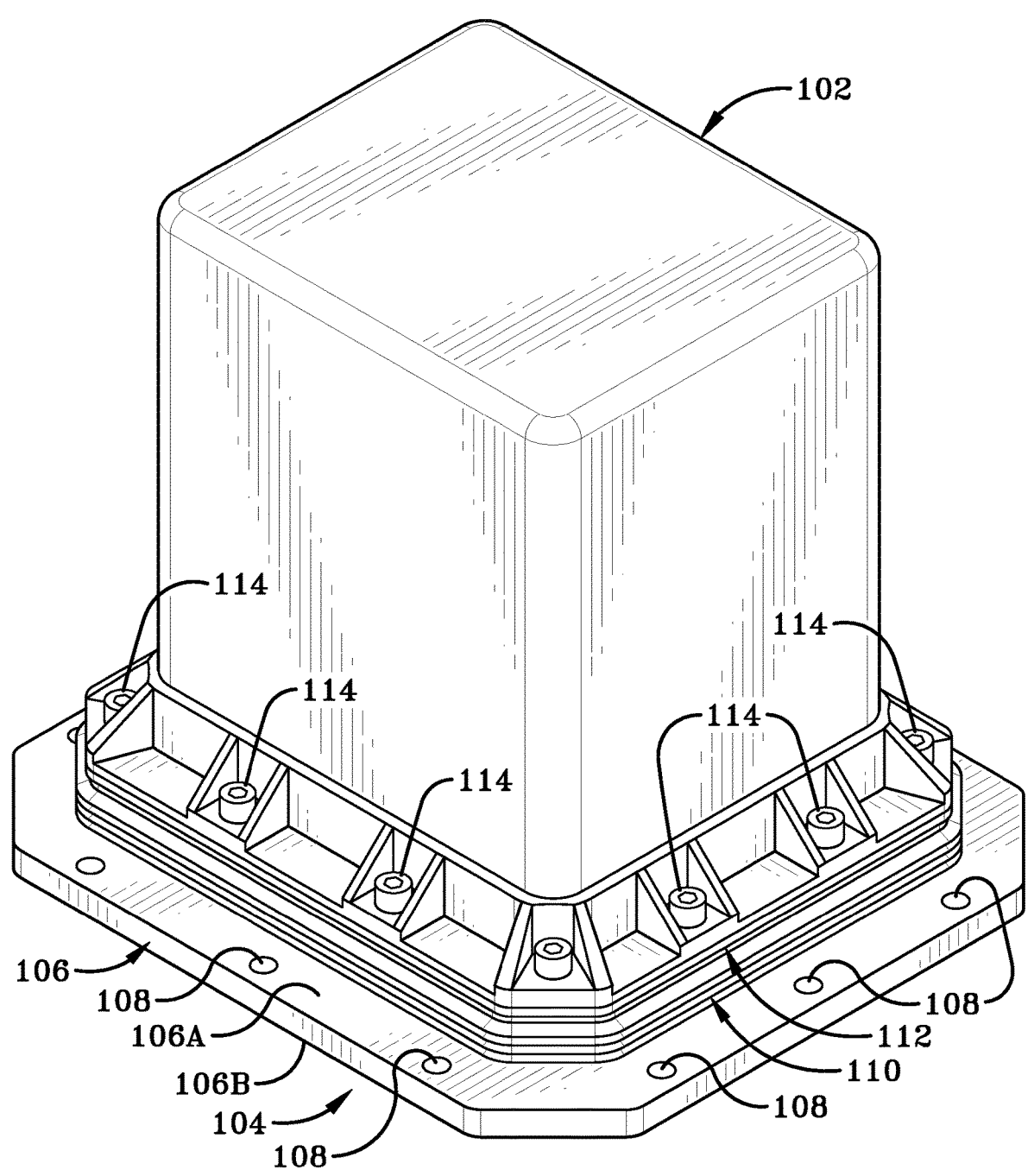
FIG. 2 is an front, top, first side isometric perspective view of a device operably engaged with a shock absorbing apparatus as shown in FIG. 1.
Figure 3:
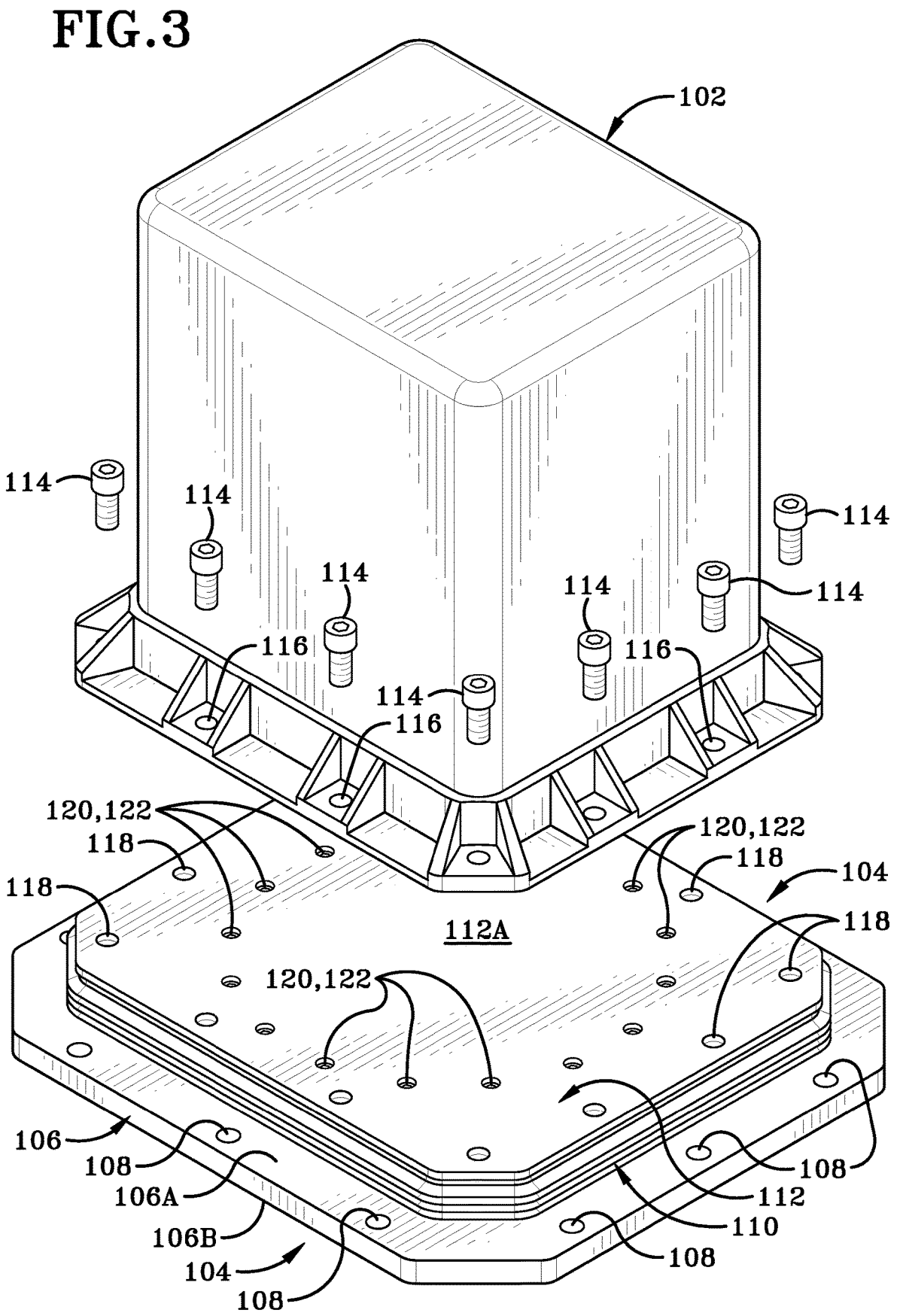
FIG. 3 is an exploded view of the device and the shock absorbing apparatus during shown in FIG. 2.

In the present disclosure, planar shock absorbing device 104 may also include a mounting plate 112. As best seen in FIG. 2, mounting plate 112 may include a first or top surface 112A that is spaced apart from the platform 100 and operably engages with shielding 102. Mounting plate 112 may also include a second or bottom surface 112B that is vertically opposite to the top surface 112A and operably engages with the upper end 110A of shroud 110. In the present disclosure, shielding 102 may be operably engaged with and coupled to the mounting plate 112 of the shock absorbing apparatus 104 using fastening mechanisms 114, such as the bolts, that are inserted through a set of attachment openings 116 defined in shielding 102 and into a set of threaded openings 118 defined in the mounting plate 112 to mount shielding 102. As best seen in FIG. 4A, each threaded opening of the set of threaded openings 118 extends vertically through the mounting plate 112 such that the top surface 112A and the bottom surface 112B are in fluid communication with one another at each threaded opening of the set of threaded openings 118. In one embodiment, mounting plate is generally rectangular or square in configuration having truncated corners that establish an irregular convex octagonal plate.

Mounting plate 112 also defines a groove 112C. As best seen in FIGS. 4A and 7A, groove 112C is defined about the perimeter of mounting plate 112 between the top surface 112A of mounting plate 112 and the bottom surface 112B of mounting plate 112. Upon assembly, a upper end 110A of shroud 110 operably engages with the mounting plate 112 inside of groove 112C. In one exemplary embodiment, the upper end 110A of shroud 110 may be adhered to and/or affixed to the mounting plate 112 inside of groove 112C. In another exemplary embodiment, the upper end 110A of shroud 110 may be frictionally fit to the mounting plate 112 inside of groove 112C. In other exemplary embodiments, the upper end 110A of shroud 110 may be operably engaged with the mounting plate 112 inside of groove 112C with any suitable components and/or materials to avoid dust, dirt, and/or other external materials inside of shock absorbing apparatus 104. Upon mounting the shielding 102 with mounting plate 112, mounting plate 112 is free from engagement with baseplate 106 and movable with respect to baseplate 106.

In the present disclosure, the number of attachment openings in the set of attachment openings 116 defined in shielding 102 is equal with number of threaded openings the set of threaded openings 118 defined in mounting plate 112 for operably engaging the shielding 102 with the mounting plate 112. It should be appreciated that shielding 102 and mounting plate 112 may have any suitable number of attachment openings 116 and threaded openings 118 to engage shielding 102 with shock absorbing apparatus 104.

Shock absorbing apparatus 104 also includes a set of retaining member 124. In the present disclosure, the set of retaining members 124 operably engages with baseplate 106 and interfaces with the mounting plate 112 to maintain the mounting plate 112 in a neutral position. In absence of a ballistic shock event, the mounting plate 112 and shielding 102 are maintained in this neutral position via the set of retaining members 124 engaging with the mounting plate 112, which is described in greater detail below. When subjected to a ballistic shock event, these parts can move to reduce impact of the ballistic shock event on the one or more devices 103 based on the engagement between the mounting plate 112, the set of retaining members 124, and a flexure member of shock absorbing apparatus 104.

In the present disclosure, the set of retaining members 124 includes a first retaining member 124A, a second retaining member 124B, a third retaining member 124C, and a fourth retaining member 124D. As best illustrated in FIG. 4B, first and third retaining members 124A, 124C are positioned diagonally opposite to each other while the second and fourth retaining members 124B, 124D are positioned diagonally opposite to each other on baseplate 106. As described in greater detail below, each of the retaining members 124A-124D may include a ball detent and a spring plunger interfaced with the ball detent to operably engage baseplate 106 with a flexure member of the shock absorbing apparatus 104 and mounting plate 112. While the illustrated embodiment includes four retaining members 124A-124D to maintain a mounting plate 112 and shielding 102 in the neutral position, shock absorbing apparatus 104 may include any suitable number of retaining members to maintain the mounting plate 112 and shielding 102 in the neutral position, while allowing these components to move when subjected to a ballistic shock event.

In the present disclosure, baseplate 106 also defines a set of fastening bores 126. As best seen in FIG. 4B, each fastening bore of the set of fastening bores 126 extends vertically through baseplate 106 between the upper surface 106A of baseplate 106 and the lower surface 106B of baseplate 106. In the present disclosure, the upper surface 106A and the lower surface 106B are in fluid communication with one another at each fastening bore of the set of fastening bores 126. As best seen in FIG. 4B, the set of fastening bores 126 is positioned interior to the set of mounting openings 108 and the upright wall 109. Such use and purpose of these set of fastening bores 126 is described in greater detail below.

Baseplate 106 also defines a set of grooves 128 formed in baseplate 106. As best seen in FIG. 4B, each groove of the set of grooves 128 extends vertically through baseplate 106 between the upper surface 106A of baseplate 106 and the lower surface 106B of baseplate 106. In the present disclosure, the upper surface 106A and the lower surface 106B are in fluid communication with one another at each groove of the set of grooves 128. As best seen in FIG. 4B, the set of grooves 128 is positioned between the upright wall 109 and the set of fastening bores 126. In practice, the set of grooves 128 are defined in the baseplate 106 to reduce the overall weight of baseplate 106. Baseplate 106 may have any suitable number of grooves 128 having any suitable pattern to reduce the weight of baseplate 106 to a desired value.

Figure 5:
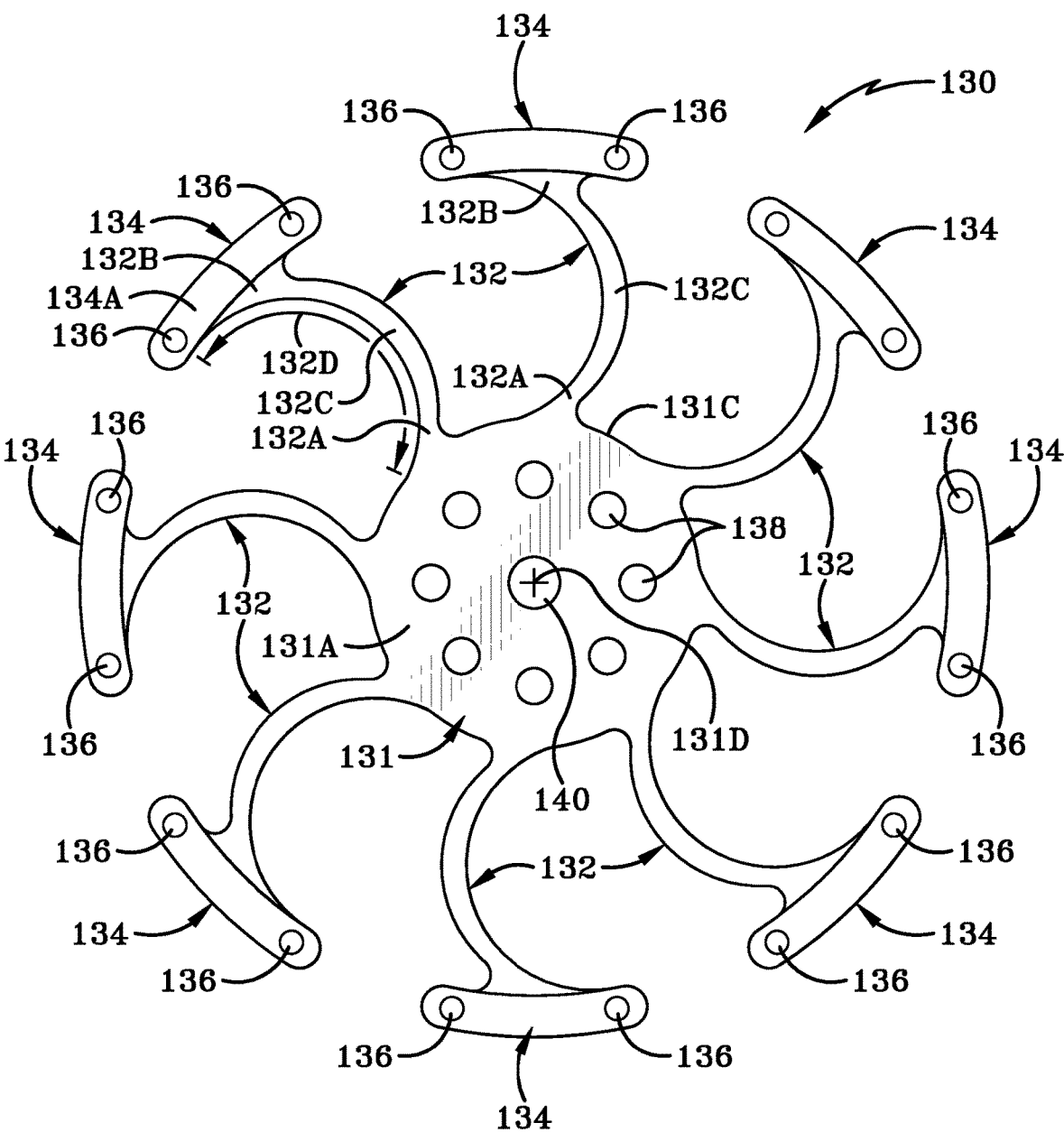
FIG. 5 is a top plan view of the flexure member of the shock absorbing apparatus.

Shock absorbing apparatus 104 may also include a flexure member 130 that is positioned between the baseplate 106 and the mounting plate 112. As best seen in FIG. 5, flexure member 130 may include a central section 131 defining a top surface 131A, a bottom surface 131B vertically opposite to the top surface 131A, and a peripheral edge 131C extending between the top surface 131A and the bottom surface 131B and circumscribing the top surface 131A and the bottom surface 131B. Upon assembly of shock absorbing apparatus 104, the top surface 131A is spaced apart from the bottom surface 112B of the mounting plate 112 while the bottom surface 131B operably engages with and contacts the upper surface 106A of the baseplate 106. Central section 131 also includes a central axis 131D that extends vertically between the top surface 131A and the bottom surface 131B. As described in greater detail below, parts and/or components that form flexure member 130 may flex and/or bend about or along the central axis 131D once a ballistic force is applied to the flexure member 130 in direction that is orthogonal to central axis 131D.

Flexure member 130 also includes a set of arms 132. As best seen in FIG. 5, each arm of the set of arms 132 includes a first end 132A that operably engages with the peripheral edge 131C of central section 131, a second end 132B longitudinally opposite to the first end 132A and remote from the central section 131, and a curved section 132C extending between the first end 132A and the second end

132B. The curved section 132C of each arm of the set of arms 132 also defines an arc length 132D that is measured between the first end 132A of each arm of the set of arms 132 to the second end 132B of each arm of the set of arms 132. In one example, the arc length 132D of each arm of the set of arms 132 is approximately four and one-half inches. In other exemplary embodiments, the arm 132 may have a section of any suitable shape or configuration that extends between the ends 132A and 132B.

Flexure member 130 may also include a set of extended members 134. The extended members 134 are shaped as distinct circumferential segments of the flexure member 130. As best seen in FIG. 5, each extended member of the set of extended members 134 operably engages with a corresponding arm from the set of arms 132. Each extended member of the set of extended members 134 also include a first or top surface 134A, a second or bottom surface 134B vertically opposite to the top surface 134A, and a peripheral wall 134C located between the top surface 134A and the bottom surface 134B. As best seen in FIG. 4B, the peripheral wall 134C of each extended member of the set of extended members 134 operably engages with the second end 132B of a corresponding arm of the set of arms 132. Upon assembly of the shock absorbing apparatus 104, the top surface 134A of each extended member of the set of extended members 134 operably engages with and contacts the bottom surface 112B of the mounting plate 112 while the bottom surface 134B of each extended member of the set of extended members 134 is also spaced apart from the baseplate 106 and is free from interfacing with the baseplate 106.

The structural configuration of each arm of the set of arms 132 of the flexure member 130 are generally designed to absorb the ballistic shock forces caused by ballistic shock events in proximity to platform 100. As described in greater detail below, one or more arms of the set of arms 132 may bend and/or flex in a first direction or in an opposing second direction relative to the central axis 131D of central section 131 to absorb the ballistic shock forces that are orthogonal to or substantially orthogonal to the central axis 131D. It will be apparent to a person skilled in the art that the flexure member 130 may have any suitable shape to perform the aforementioned functionalities, without deviating from the scope of the present disclosure. In one instance, a first arm of the set of arms 132 may be measured at a first length (W1) from the central axis 131D to a corresponding extend member of the set of extended members 134 in the absence of a ballistic shock event (see FIG. 6). Similarly, a second arm of the set of arms 132 opposing the first arm may be measured at a second length (W2) from the central axis 131D to a corresponding extend member of the set of extended members 134 in the absence of a ballistic shock event (see FIG. 6). In this instance, the first distance and the second distance are equal with one another.

Figure 6:
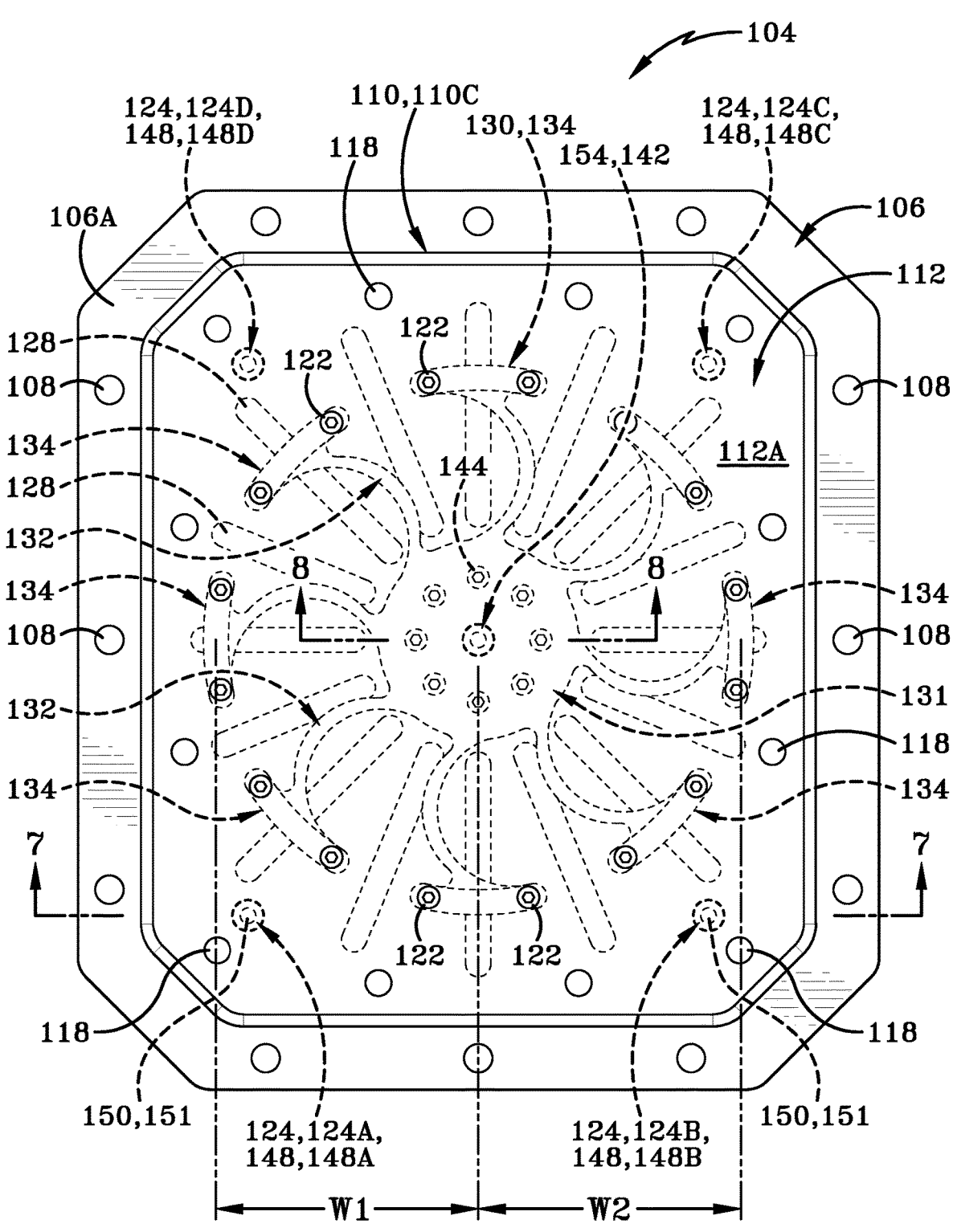
FIG. 6 is a top plan view of the shock absorbing apparatus, wherein a portion of the baseplate, the set of retaining members, a central retaining member, and the flexure member are shown in phantom lines.

Each extended member 134 also defines a pair of fastening bores 136 that extends vertically through each extended member of the set of extended members 134. As shown in FIG. 6, fastening bores 136 of extended members 134 are configured to receive the set of fastening members 122 in order to couple the flexure member 130 with mounting plate 112. As such, each fastening member of the set of fastening members 122 passes through the set of openings 120 of mounting plate 112 and threadably engages with the set of extend members 134 via the fastening bores 136. In one exemplary embodiment, each of the fastening members 122 may have an externally threaded portion to engage with an internally threaded portion of the respective opening 120 and an internally threaded portion of the respective fastening bore 136.

Flexure member 130 also defines a set of openings 138 formed in the central section 131 of the flexure member 130. In the illustrated embodiment, each threaded opening of the set of openings 138 extends downwardly into the central section 131 from the top surface 131A of central section 131 towards the bottom surface 131B of central section 131. Still referring to FIG. 5, central section 131 also defines a central threaded opening 140 that extends vertically through the central section 131 from the top surface 131A to the bottom surface 131B. In the present disclosure, the top surface 131A and the bottom surface 131B are in fluid communication with one another at the central threaded opening 140.

Upon assembly of planar shock absorbing apparats 104, the bottom surface 112B of the mounting plate 112 is mounted on and interfaces with the top surfaces 134A of the set of extended members 134 of the flexure member 130 while the top surface 131A of central section 131 is spaced apart from the bottom surface 112B of mounting plate 112. Upon assembly of planar shock absorbing apparats 104, the bottom surface 131B of the central section 131 of the flexure member 130 is mounted on and interfaces with the upper surface 106A of baseplate 106. Fastening bores 126 of baseplate 106 and the set of openings 138 of the flexure member 130 are configured to receive fastening members 144 that couple the central section 131 of flexure member 130 to baseplate 106. Stated differently, flexure member 130 operably engages with baseplate 106 via the fastening members 144 that are threadably engaged with the set of openings 138 formed in the flexure member 130 and fastening bores 126 formed in baseplate 106.

In the present disclosure, central opening 140 of flexure member 130 is configured to receive a central retaining member 142. As will be described in further detail with reference to FIGS. 7-8, central retaining member 142 operably engages with the flexure member 130, via the central opening 140, and interfaces with the mounting plate 112 to maintain the mounting plate 112 and shielding 102 in the neutral position in the absence of a ballistic shock event. Such components and parts of central retaining member 142 are described in further detail below.

Mounting plate 112 also defines a set of grooves 145. As best seen in FIG. 4B, each groove of the set of grooves 145 extends vertically upward into the mounting plate 112 from the bottom surface 112B of mounting plate 112 towards the top surface 112A of the mounting surface 112. In practice, the set of grooves 128 are defined in the mounting plate 112 to reduce the overall weight of mounting plate 112. Mounting plate 112 may have any suitable number of grooves 145 having any suitable pattern to reduce the weight of mounting plate 112 to a desired value.

In the present disclosure, baseplate 106 defines a set of threaded openings 146 that extend downwardly into the baseplate 106 from the upper surface 106A to the lower surface 106B (see FIGS. 7-7A). As best seen in FIGS. 4B, the set of threaded openings 146 includes a first threaded opening 146A for engaging the first retaining member 124A with baseplate 106, a second threaded opening 146B for engaging the second retaining member 124B with baseplate 106, a third threaded opening 146C for engaging the third retaining member 124C with baseplate 106, and a fourth threaded opening 146D for engaging the fourth retaining member 124D with baseplate 106.

In the present disclosure, mounting plate 112 also defines a set of second engagement cavities 148 that extend upwardly into the mounting plate 112 from the bottom surface 112B towards the top surface 112A. Upon assembly of the shock absorbing apparatus 104, each engagement cavity of the set of engagement cavities 148 is directly aligned with a corresponding threaded opening of the first set of threaded openings 146 of the baseplate 106. As best seen in FIG. 6, the set of engagement cavities 148 includes a first engagement cavity 148A that is directly aligned with the first threaded opening 146A, a second engagement cavity 148B that is directly aligned with the second threaded opening 146B, a third engagement cavity 148C is directly aligned with the third threaded opening 146C, and a fourth engagement cavity 148D is directly aligned with the fourth threaded opening 146D.

The first set of threaded openings 146 of baseplate 106 and the second set of engagement cavities 148 of mounting plate 112 are configured to receive the set of retaining members 124 that couples the baseplate 106 to the mounting plate 112. Specifically, each retaining member of the set of retaining members 124 includes a ball detent 150 having a terminal end 151 that interfaces with a corresponding spring plunger 152 whereby the ball detent 150 moves inwardly and outwardly of said spring plunger 152. In the present disclosure, spring plunger 152 is disposed within and operably engages with baseplate 106 inside a threaded opening of the set of threaded openings 146, and the ball detent 150 is disposed within and operably engages with the mounting plate 112 at an engagement cavity of the set of second engagement cavities 148.

In the present disclosure, each engagement cavity of the set of engagement cavities 148 includes an upper chamber 149A and a lower annular recess 149B formed in the mounting plate 112 by a first set of interior walls 149C and a second set of interior walls 149D. As best seen in FIG. 7A, the second set of interior walls 149D extends upwardly from the bottom surface 112B of mounting plate 112 to the first set of interior walls 149C. In the illustrated embodiment, the second set of interior walls 149D tapers inwardly from the bottom surface 112B to the first set of interior walls 149C thus defining the lower annular recess 149B. Stated differently, the second set of interior walls 149D is sloped and/or angled inwardly from the bottom surface 112B to the first set of interior walls 149C thus defining the lower annular recess 149B. In one example, each interior wall of the second set of interior walls 149D may be defined at an angle approximately 45 degrees measured relative to the bottom surface 112B of the mounting plate 112. Still referring to FIG. 7A, the first set of interior walls 149C extends upwardly from the second set of interior walls 149D towards the top surface 112A of mounting plate 112.

Figure 11A:
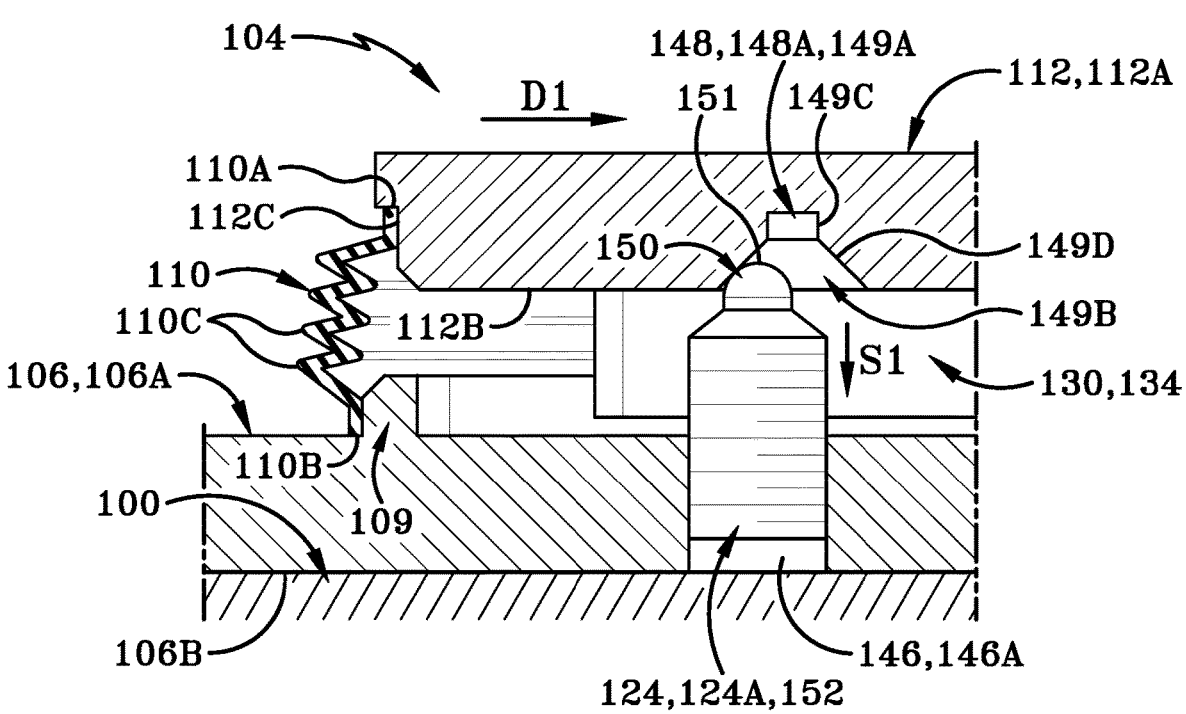
FIG. 11A is an enlarged operational view of the highlighted region labeled in FIG. 11, wherein the mounting plate shifts from the neutral position to the translated position causing each retaining member of the set of retaining members to transition downwardly and disengage from the mounting plate.
Figure 11B:
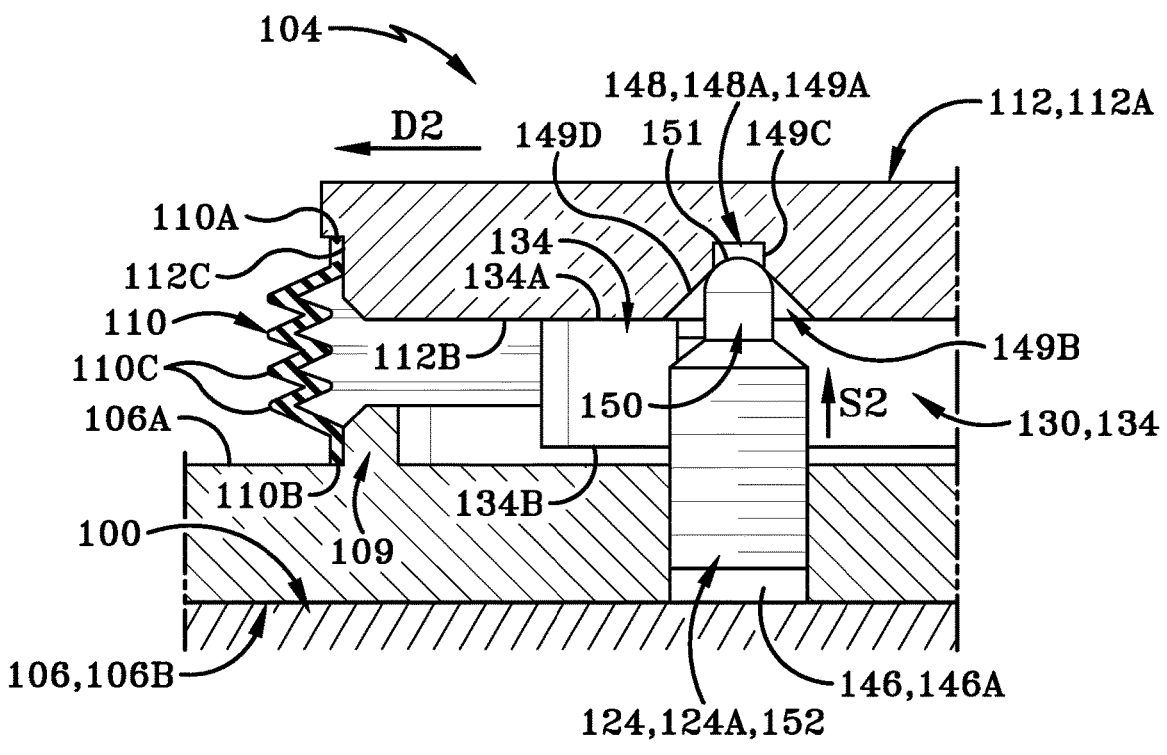
FIG. 11B is another operational view similar to FIG. 11A, but the flexure member applies a dampening force on the mounting plate causing the mounting plate to transition from the translated position back to the neutral position and to reengage with each retaining member of the set of retaining members.

During operation, the ball detent 150 of each retaining member of the set of the set of retaining members 124 is free to move along the respective second set of interior walls 149D when shock absorbing apparatus 104 is subjected to a ballistic shock event (see FIGS. 11A-11B). This structural configuration between the set of retaining members 124 and the set of second engagement cavities 148 formed in mounting plate 112 helps control the movement of mounting plate 112 during a ballistic shock event. In the absence of a ballistic shock event, terminal end 151 of ball detent 150 of each retaining member of the set of retaining member 124 is housed inside of the upper chamber 149A of each engagement cavity of the set of engagement cavities 148 while the remaining outer edge of the ball detent 150 is frictionally fit with the second set of interior walls 149D to hold mounting plate 112 in a neutral position (see FIGS. 7-7A).

Figure 8:
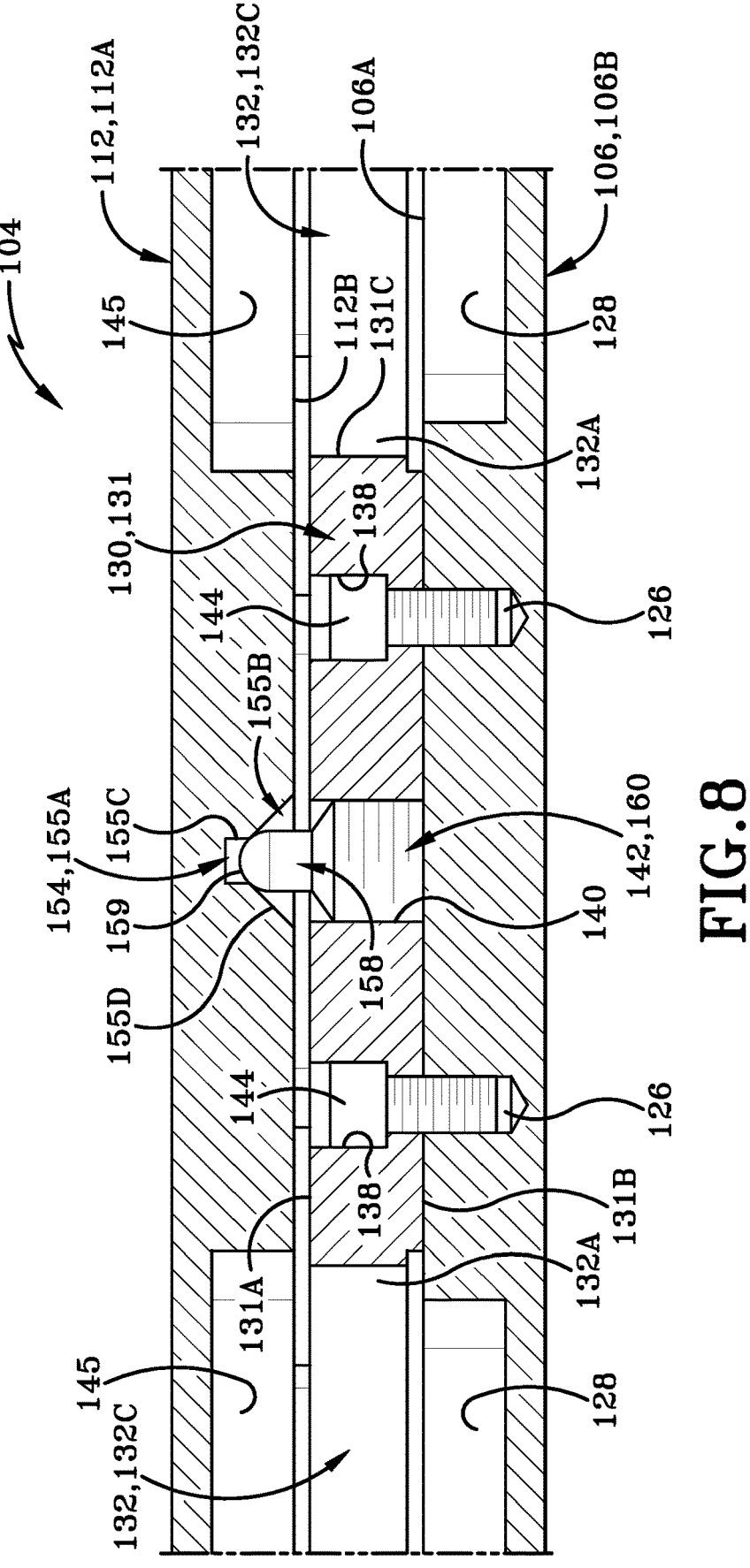
FIG. 8 is a partial cross-sectional view of the shock absorbing apparatus taken in the direction of line 8-8 in FIG. 6.

The mounting plate 112 also defines a central engagement cavity 154 extending upwardly from the bottom surface 112B towards the top surface 112A. As best seen in FIG. 8, central engagement cavity 154 includes an upper chamber 155A and a lower annular recess 155B defined by a first set of inner walls 155C and a second set of inner walls 155D. As best seen in FIG. 8, the second set of inner walls 155D extends upwardly from the bottom surface 112B of mounting plate 112 to the first set of inner walls 155C. In the illustrated embodiment, the second set of inner walls 155D tapers inwardly from the bottom surface 112B to the first set of inner walls 155C thus defining the lower annular recess 155B. Stated differently, the second set of inner walls 155D is sloped and/or angled inwardly from the bottom surface 112B to the first set of inner walls 155C thus defining the lower annular recess 155B. In one example, each inner wall of the second set of inner walls 155D may be defined at an angle approximately 45 degrees measured relative to the bottom surface 112B of the mounting plate 112. Still referring to FIG. 8, the first set of inner walls 155C extends upwardly from the second set of inner walls 155D towards the top surface 112A of mounting plate 112.

In the present disclosure, a ball detent 158 of central retaining member 142 operably engages with the mounting plate 112 inside of central engagement cavity 154. Specifically, ball detent 158 has a terminal end 159 that engages with the upper chamber 155A of central engagement cavity 154 to hold the mounting plate 112 in a neutral position. Central retaining member 142 also includes a spring plunger 160 that is engaged with flexure member 130 inside of central opening 140 and operably engages with a corresponding ball detent 158.

Figure 12A:
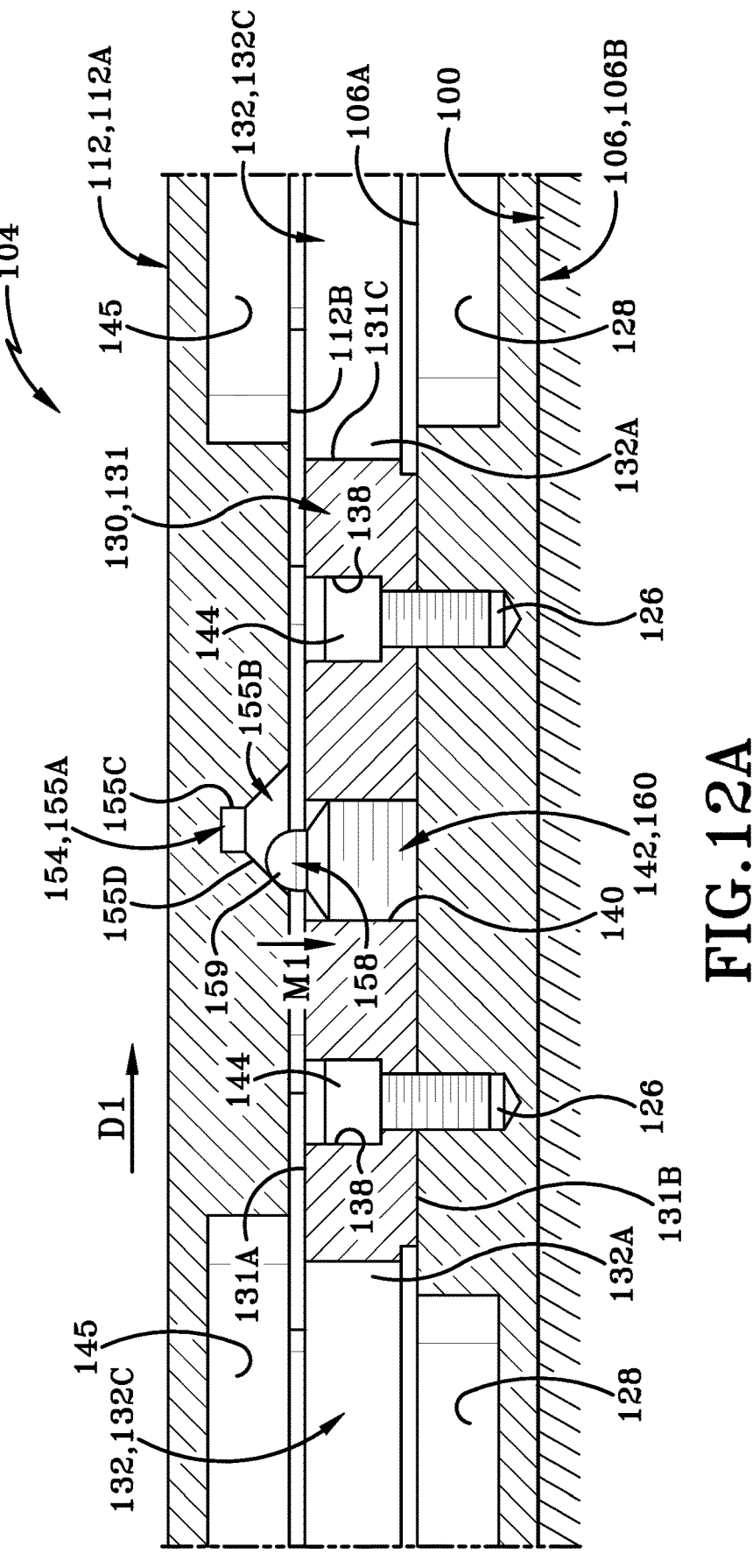
FIG. 12A is another operational partial cross-sectional view of shock absorbing apparatus, taken in the direction of line 12A-12A in FIG. 10, but the mounting plate transitions from the neutral position to the translated position causing the central retaining member to transition downwardly and disengage from the mounting plate.
Figure 12B:
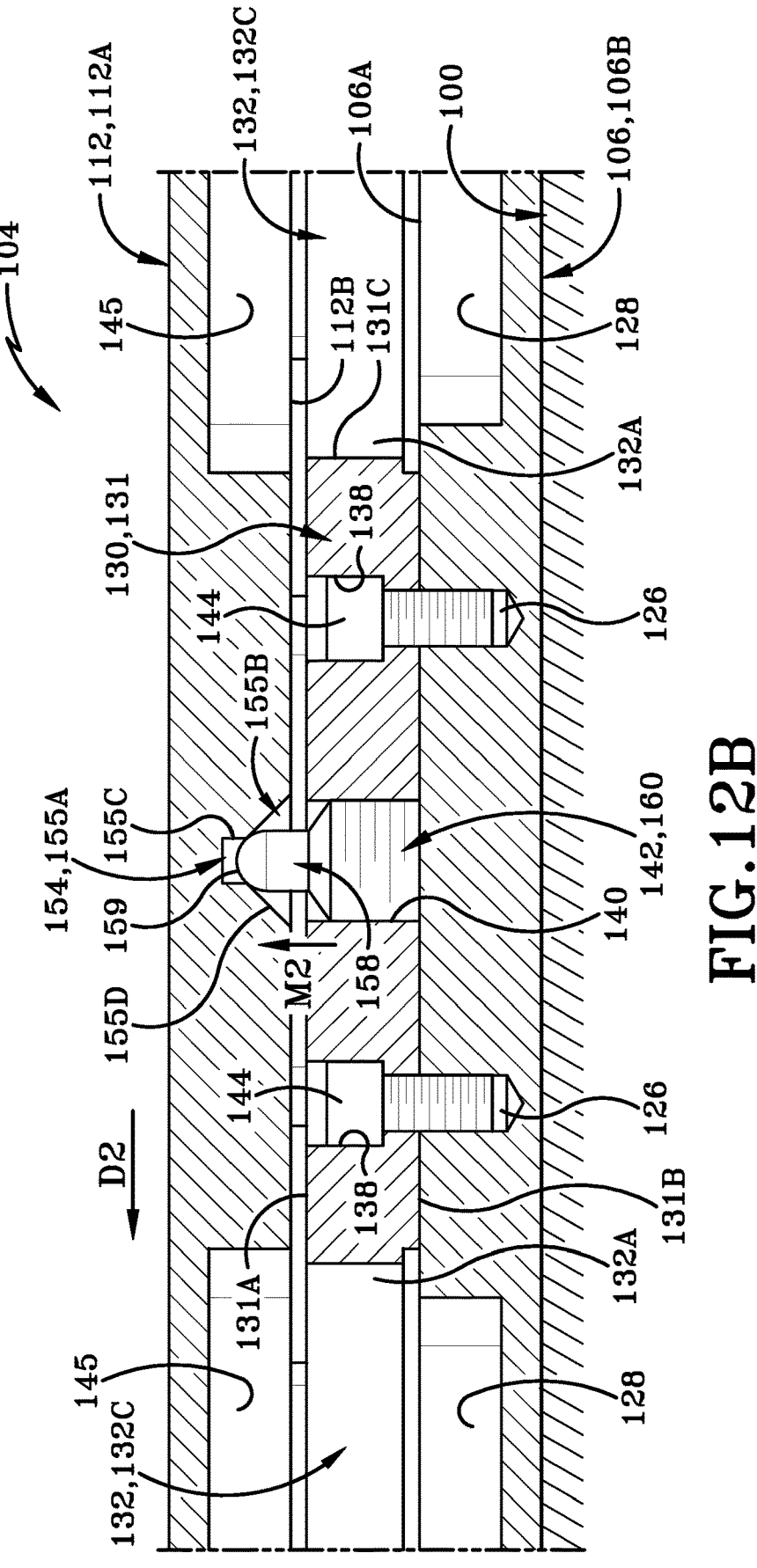
FIG. 12B is an operational partial cross-sectional view similar to FIG. 12A, but the flexure member applies the dampening force on the mounting plate causing the mounting plate to transition from the translated position back to the neutral position and reengages with the central retaining member.

Similar to the set of retaining members 124, the ball detent 158 of central retaining member 142 is free to move along the respective second set of inner walls 155D when shock absorbing apparatus 104 is subjected to a ballistic shock event (see FIGS. 12A-12B). This structural configuration between the central retaining member 142 and the central engagement cavity 154 formed in mounting plate 112 helps control the movement of mounting plate 112 during a ballistic shock event. In the absence of a ballistic shock event, the terminal end 159 of ball detent 158 of the central retaining member 142 is housed inside of the upper chamber 155A of the central engagement cavity 154 while the remaining outer edge of the ball detent 158 is frictionally fit with the second set of inner walls 155D to hold mounting plate 112 in a neutral position (see FIG. 8).

In the present disclosure, device 103 is configured to electrically communicate with another electrical unit provided on platform 100 via conventional wireless connection. In other examples, however, shock absorbing apparatus 104 may enable device 103 to electrically communicate with another electrical unit provided on platform 100 based on the implementation of device 103. In one instance, mounting plate 112 may define at least one opening or aperture designated for receiving and housing one or more electrical connections or wires to enable device 103 to electrically communicate with another electrical unit provided on platform 100. In this same instance, one or both of the baseplate 106 and flexure member 130 may also be configured to receive and house one or more electrical connections or wires to enable device 103 to electrically communicate with another electrical unit provided on platform 100. In another instance, shock absorbing apparatus 104 may include an intermediate jumper cable equipped with a service loop inside of the shock absorbing apparatus 104 to electrically communicate with another electrical unit provided on platform 100 based on the implementation of device 103.

In the present disclosure, shock absorbing device 104 is configured to absorb and remove shock experienced in a longitudinal axis and a lateral axis that are orthogonal to the vertical axis of device 103 and/or the central axis 131D of flexure member 130. In other examples, however, shock absorbing device 104 may include additional components, elements, or orientations to absorb and remove shock experienced in a vertical axis that is substantially parallel with the vertical axis of device 103 and/or the central axis 131D of flexure member 130. In one instance, shock absorbing elements (e.g., elastomeric isolators, washers, etc.) may be placed between the device 103 and the top surface 112A of mounting plate 112 to absorb and remove shock experienced in a vertical axis that is substantially parallel with the vertical axis of device 103 and/or the central axis 131D of flexure member 130. In another instance, shock absorbing elements (e.g., elastomeric isolators, washers, etc.) may be placed between the mounting plate 112 and the baseplate 106 to absorb and remove shock experienced in a vertical axis that is substantially parallel with the vertical axis of device 103 and/or the central axis 131D of flexure member 130. In another instance, one or more shock absorbing apparatuses 104 may be mounted along a vertical or upright surface of platform 100 that enables the one or more shock absorbing apparatuses 104 to absorb and remove shock experienced in a vertical axis that is substantially parallel with the vertical axis of device 103 and/or the central axis 131D of flexure member 130.

Having now described the parts and components of shock absorbing apparatus 104, a method of absorbing a ballistic shock by the shock absorbing apparatus 104 is described in greater detail below.

Figure 9:
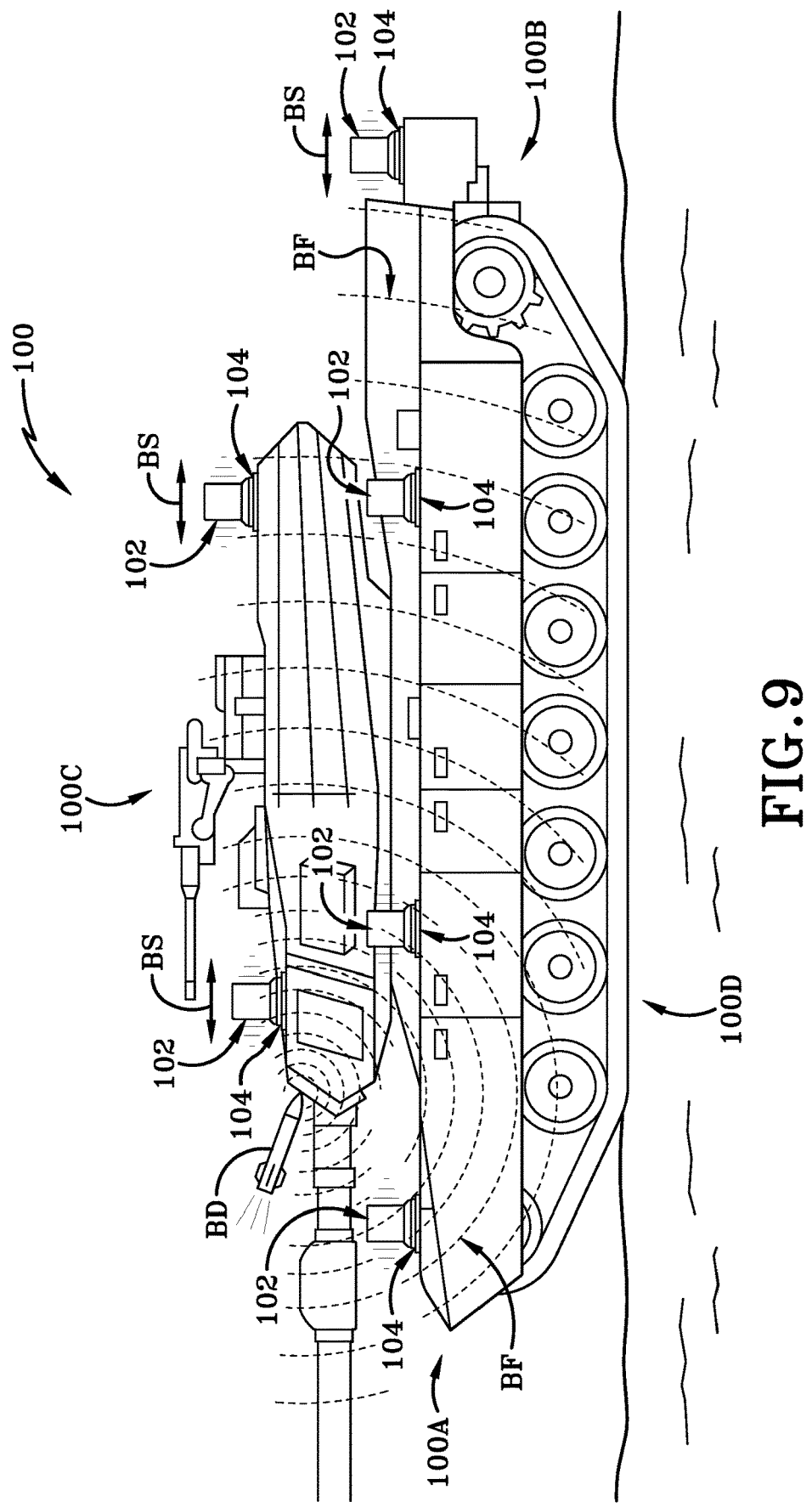
FIG. 9 is an operational view of a ballistic shock event occurring at the front end of platform due to a ballistic device impacting platform and/or detonating.
Figure 10:
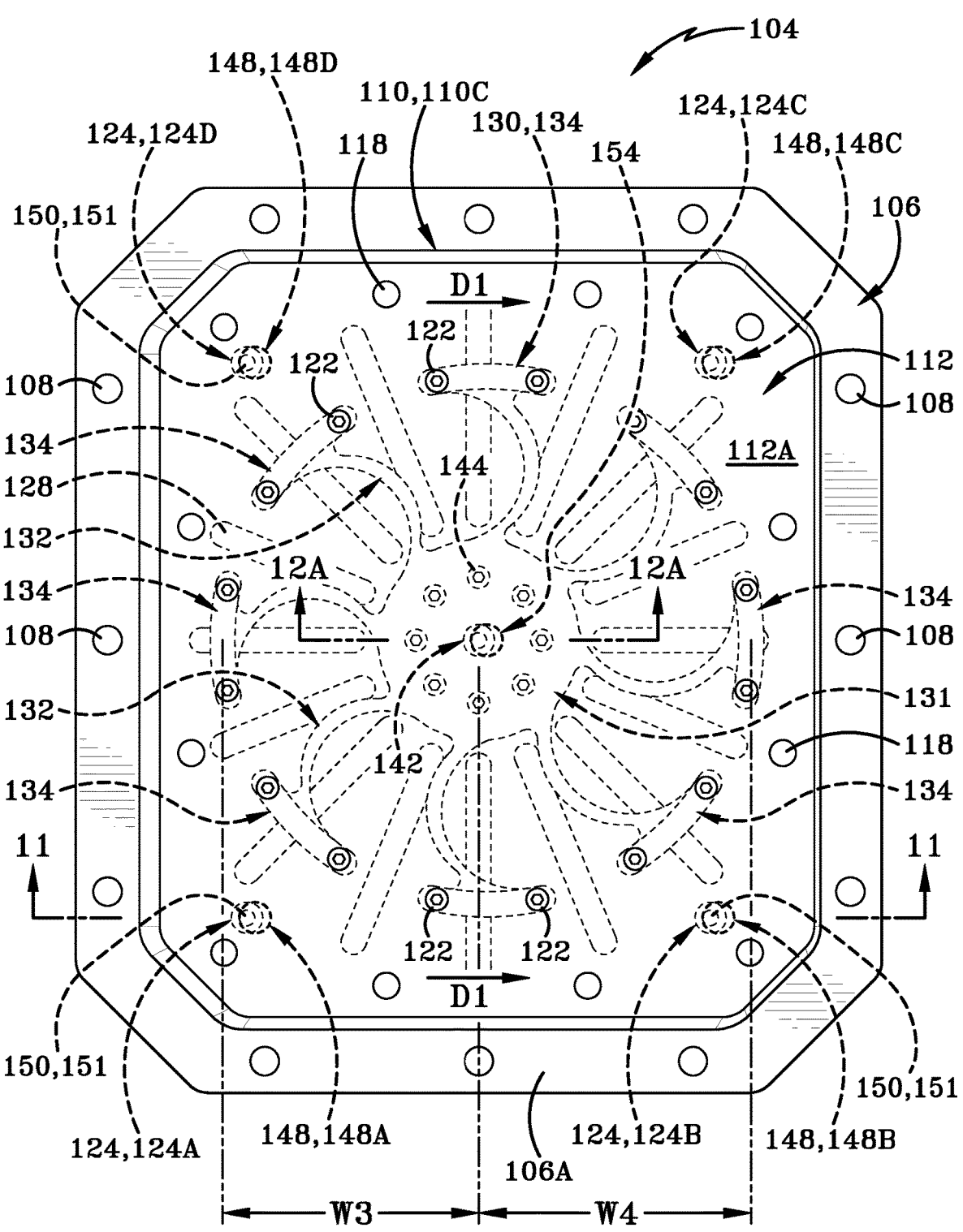
FIG. 10 is another operational view similar to FIG. 9, but the device, the mounting plate, the shroud, and the flexure device of the shock absorbing apparatus collectively transition from neutral positions to translated positions.

As seen in FIG. 9, an exemplary ballistic shock event occurs at the front end 100A of platform 100 due to a ballistic device (BD) impacting platform 100 and/or detonating. This impact and/or detonation of the ballistic device causes ballistic shock (BS) and radiates a ballistic force (BF) at platform 100 in a direction that is substantially orthogonal to the central axis 131D and/or a vertical axis of device 103. During a ballistic shock event, each shock absorbing apparatus 104 is adapted to absorb and dampen the ballistic shock and/or force caused by the ballistic shock event. Such shock absorption by the shock absorbing apparatus 104 helps stabilize the one or more devices 103 from the effects of the ballistic shock that detonated proximate to or near platform 100 without physically impacting platform 100. As such, the ballistic device may detonate and generate ballistic shock at a distance away from platform 100 that would normally affect devices 103 at platform 100. However, in accordance with the disclosed embodiment, each shock absorbing apparatus 104 may absorb and dampen that ballistic force or shock caused by the ballistic device. Absorption and dampening of the ballistic shock by each shock absorbing apparatus 104 can be considered advantageous because ballistic shock forces that would normally impact devices 103 may be reduced and/or eliminated. This in turn reduces the likelihood of damage and impairment of any electrical components, mechanical components, or other components that allows the one or more devices 103 to operate and function as intended.

As the ballistic shock is received by the shock absorbing apparatus 104, the shock absorbing apparatus 104 transitions from the neutral position to a translated position as the shock absorbing apparatus 104 absorbs and dampens the ballistic shock that will be experienced on platform 100. As seen in FIG. 11, the shielding 102, the one or more devices 103, and the mounting plate 112 shift or translate towards the rear end 100B of platform 100 due to the ballistic shock impacting the front end 100A of platform 100. The displacement of the shielding 102, the one or more devices 103, and the mounting plate 112 from the neutral position to the translated position is indicated by arrows labeled "D1" in FIGS. 10, 11, 11A and 12A. Such displacement of the mounting plate 112 along with shielding 102 and the one or more devices 103 from the neutral position to the translated position is enabled due to the ball detents 150 of the set of retaining members 124 being pressed downwardly into the spring plunger 152. Such displacement of the mounting plate 112 along with shielding 102 and the one or more devices 103 from the neutral position to the translated position may also be enabled due to the ball detent 158 of the central retaining member 142 being pressed downwardly into the spring plunger 160.

During this displacement, flexure member 130 flexes and/or bends in a first direction about or along the central axis 131D as the shielding 102, the device 103, and the mounting plate 112 collectively transition from the neutral position to the translated position based. Particularly, the set of arms 132 and set of extended members 134 collectively flex and/or bend in the first direction to dampen and absorb a desired amount of ballistic force as implemented in the flexure member 130. In this instance, a first arm of the set of arms 132 may be measured at a third length (W3) from the central axis 131D to a corresponding extend member of the set of extended members 134 upon receiving a ballistic force from a ballistic shock event (see FIG. 10). Similarly, a second arm of the set of arms 132 opposing the first arm may be measured at a fourth length (W4) from the central axis 131D to a corresponding extend member of the set of extended members 134 upon receiving a ballistic force from a ballistic shock event (see FIG. 10). In this instance, however, the first length (W1 in FIG. 6), the second length (W2 in FIG. 6), and the third length (W3) are equal with one another, but the fourth length (W4) is greater than the first length (W1), the second length (W2), and the third length (W3) due to the ballistic force being applied to the flexure member 130. Such differences in lengths helps diagrammatically illustrate the dampening and/or absorbing effects the flexure member 130 provides to the parts and/or components connected with the set of arms 132 and the set of extended members 134.

While not illustrated herein, flexure member 130 may flex and/or bend in a first rotational direction or clockwise direction about the central axis 131D as the shielding 102, the device 103, and the mounting plate 112 collectively transition from the neutral position to the translated position. Particularly, the set of arms 132 and set of extended members 134 collectively flex and/or bend in the first rotational direction to dampen and absorb a desired amount of ballistic force as implemented in the flexure member 130. It should be appreciated that one or more parts of the flexure member 130 (e.g., central portion 131, set of arms 132, set of extended member 134) may linearly move and/or rotational move to dampen and absorb a desired amount of ballistic force from the shielding 102, the device 103, and the mounting plate 112.

As illustrated in FIGS. 11-11A and 12A, the set of arms 132 and the set of extended members 134 enables the shielding 102, the device 103, and mounting plate 112 to laterally shift along the baseplate 106 to create a dampening mechanism between the shielding 102, the device 103, and mounting plate 112 on the platform 100. The flexure member 130 will continue to flex and/or bend in the first rotational direction until the dampening force applied by the flexure member 130 is greater than the ballistic force in which the ballistic force has dissipated.

During these dampening events by flexure member 130, the ball detent 150 of a first retaining member 124A rides along the second set of interior walls 149D as the ball detent 150 of the first retaining member 124A is pressed downwardly into the spring plunger 152 via the lateral shift and displacement of shielding 102 and mounting plate 112. The vertical pressing force on the ball detent 150 and the spring plunger 152 is indicated by an arrow labeled "S1" shown in FIG. 11A. The spring plunger 152 also compresses in length due to the vertical pressing force being applied to the ball detent 150 by the shielding 102, the device 103, and the mounting plate 112. The pressing force exerted by the shielding 102, the device 103, and the mounting plate 112 further disengages the terminal end 151 of the ball detent 150 from the upper chamber 149A of a corresponding engagement cavity 148A and engages the terminal end 151 of the ball detent 150 with the second set of interior walls 149D inside of the lower annular recess 149B of each engagement cavity of the set of engagement cavities 148. In this regard, the terminal end 151 of the ball detent 150 is adapted to slidably move along the second set of interior walls 149D inside of the lower annular recess 149B of the corresponding engagement cavity 148A. Although not illustrated in FIGS. 11 and 11A, the second, third, and fourth retaining members 124B-124D function in a manner similar to the first retaining member 124A as described above.

Additionally, as shown in FIG. 11A, the lower end 110B of shroud 110 is engaged with baseplate 106 and the upper end 110A of shroud 110 that is engaged with the mounting plate 112. During the ballistic shock event, shroud 110 remains coupled with mounting plate 112 and baseplate 106 via the upper end 110A and the lower end 110B, respectively, to protect the set of retaining members 124, the flexure member 130, the central retaining member 142, and other internal components housed inside of the shroud 110 from the external elements. The shape of shroud 110 thus changes as the shock absorbing apparatus 104 shifts from the neutral position to the translated position.

Once the flexure member 130 absorbs the force exerted by the ballistic device and is greater than the dissipated ballistic force, the shielding 102, the one or more devices 103, and the mounting plate 112 transition from the translated position back to the neutral position. In this case, the flexure member 130 applies an opposing dampening force greater than the dissipated ballistic force by moving in a second direction opposite to the first direction about or along the central axis 131D. Here, the flexure member 130 is designed to retract to and/or bend back to the original shape and/or configuration (i.e., the lengths each arm of the set of arms 132 are provided at equal lengths with one another). The shielding 102, the device 103, and the mounting plate 112 are displaced such that the shielding 102, the device 103, and the mounting plate 112 collectively translate or shift from the translated position back to the neutral position in a direction indicated by arrow labeled "D2" in FIG. 11B. As the mounting plate 112 translates or shifts in the direction D2 towards the front end 100A of platform 100 and back toward the neutral position after the ballistic shock event, the terminal end 151 of the ball detent 150 of first retaining member 124A slidably moves upwardly along the second set of interior walls 149D inside of lower annular recess 149B of the engagement cavity 148A until each ball detent 150 engages with the upper chamber 149A of the engagement cavity 148A to hold the mounting plate 112 in the neutral position.

While not illustrated herein, flexure member 130 may flex and/or bend in a second rotational direction or counterclockwise direction about the central axis 131D as the shielding 102, the device 103, and the mounting plate 112 collectively transition from the neutral position to the translated position. Particularly, the set of arms 132 and set of extended members 134 collectively flex and/or bend in the second rotational direction to dampen and absorb a desired amount of ballistic force as implemented in the flexure member 130. It should be appreciated that one or more parts of the flexure member 130 (e.g., central portion 131, set of arms 132, set of extended member 134) may linearly move and/or rotational move to dampen and absorb a desired amount of ballistic force from the shielding 102, the device 103, and the mounting plate 112.

When the ballistic shock has dissipated enough such that an expansion strength of spring plunger 152 is greater than the ballistic shock, the spring plunger 152 of the first retaining member 124A applies an expansion force on ball detent 150 that is greater than the ballistic shock. As such, spring plunger 152 transitions from the compressed length to its original length (e.g., prior to compression) thereby causing ball detent 150 and mounting plate 112 to move towards the neutral position as shown in FIG. 11B. The vertical transitioning of the spring plunger 152 causes ball detent 150 to move upwardly is reflected by an arrow labeled "S2" in FIG. 11B. Additionally, when the ballistic shock has dissipated enough that the expansion strength is greater than the ballistic shock, ball detent 150 applies a pressing force on the second set of interior walls 149D inside of lower annular recess 149B of engagement cavity 148A that is greater than the ballistic shock thereby urging mounting plate 112 back into the neutral position. Although not illustrated in FIG. 11B, the second, third, and fourth retaining members 124B-124D react and function in a similar manner to maintain mounting plate 112 and shielding 102 in the neutral position after the ballistic shock event.

Further, as shown in FIG. 11B, the upper end 110A of the shroud 110, that is engaged with the mounting plate 112, shifts from the translated position (FIG. 11A) back to the neutral position (FIG. 11B), thus, returning to the original shape after the ballistic shock event.

Similar to the set of retaining members 124, the shielding 102, the one or more devices 103, and the mounting plate 112 also apply the pressing force onto the terminal end 159 of the ball detent 158 of the central retaining member 142 when the shock absorbing apparatus 104 transitions from the neutral position to the translated position. Such force applied to the central retaining member 142 causes the ball detent 158 and the spring plunger 160 to transition or shift downwardly towards the bottom end 100D of platform 100. The shift due to this vertical pressing force on the ball detent 158 and the spring plunger 160 is indicated by the arrow labeled "M1" in FIG. 12A. The spring plunger 160 compresses in length due to the vertical pressing force. The pressing force exerted by the shielding 102, the device 103 and the mounting plate 112 further disengages the terminal end 159 of the ball detent 158 from the upper chamber 155A of the central engagement cavity 154 and engages the terminal end 159 of the ball detent 158 with the lower annular recess 155B of the central engagement cavity 154. The terminal end 159 of the ball detent 158 slidably moves along the lower annular recess 155B of central engagement cavity 154.

Once the flexure member 130 absorbs the force exerted by the ballistic device, the shielding 102, the device 103, and mounting plate 112 then transition from the translated position back to the neutral position based on the flexure member 130 uncoiling and/or moving in the second direction discussed above. The displacement of the mounting plate 112 from the translated position back to the neutral position is indicated by arrow labeled "D2" in FIG. 12B. As illustrated, when the ballistic shock has dissipated enough that an expansion strength of the spring plunger 160 is greater than the ballistic shock, the spring plunger 160 applies an expansion force on the ball detent 158 that is greater than the ballistic shock. As such, the spring plunger 160 transitions from the compressed length to an original length, which causes the ball detent 158 and the mounting plate 112 to move towards the neutral position. In other words, the vertical transitioning of the spring plunger 160 causes the ball detent 158 to move upwardly as indicated by the arrow labeled "M2" in FIG. 12B.

Additionally, when the ballistic shock has dissipated enough that the expansion strength of the spring plunger 160 is greater than the ballistic shock, the ball detent 158 applies a pressing force on the lower annular recess 155B of the central engagement cavity 154 that is greater than the ballistic shock. This causes the mounting plate 112 to transition from the translated position to the neutral position. As illustrated in FIG. 12B, the mounting plate 112 shifts or displaces towards the front end 100A of platform 100 due to the pressing force of the central retaining member 142 being directed from the rear end 100B of platform 100 towards the front end 100A of platform 100 in the direction of arrow D2. Further, when the mounting plate 112 transitions from the translated position back to the neutral position after the ballistic shock event, the terminal end 159 of the ball detent 158 slidably moves from lower annular recess 149B of the central engagement cavity 154 and engages back with the upper chamber 149A of the central engagement cavity 154 to hold the mounting plate 112 in the neutral position. Shock absorbing apparatus 104 thus dampens and absorbs the ballistic shock caused by the ballistic device during a ballistic shock event and returns to its neutral position after the ballistic shock event is over.

In the present disclosure, the terms "ballistic shock" or "projectile motion event" used herein may refer to various mechanical or physical shock scenarios or events that cause or create sudden or violent disturbances to a platform or vehicle mentioned herein. In one instance, and as illustrated herein, ballistic shock or projectile motion event may refer to a projectile or ballistic device that impacts or strikes a platform or vehicle (i.e., a direct collision) that generates a sudden or violent disturbance to the platform or vehicle. In another instance, ballistic shock or projectile motion event may refer to a projectile or ballistic device that impacts or strikes near or proximate to a platform or vehicle (i.e., an indirect collision) that generates a sudden or violent disturbance to the platform or vehicle. In yet another instance, ballistic shock or projectile motion event may also refer to multiple discharges of one or more firearms on the platform (i.e., gunfire) that generates one or more sudden or violent disturbances to a platform or vehicle mentioned herein. In yet another instance, ballistic shock or projectile motion event may also refer to recoil and/or kickback generated by one or more weapons of the platform or vehicle when discharging the one or more weapons during military operations (i.e., munition launch from the platform, electromagnetic railgun launching projectile at substantially high velocities, etc.).

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A shock absorbing apparatus, comprising:

a baseplate adapted to be mounted on a platform;

a flexure member operably engaging with the baseplate;

a mounting plate operably engaging with the flexure member, wherein the mounting plate is free from direct engagement with the baseplate and moveable between a neutral position and a translated position with respect to the baseplate, and wherein the mounting plate is adapted to hold a device;

wherein the flexure member is adapted to absorb ballistic shock forces caused by a ballistic shock event in proximity to or applied on the platform;

a shroud operably engaged with the baseplate and the mounting plate to protect the flexure member from external elements surrounding the shock absorbing apparatus and the platform, wherein the shroud includes folds between an upper surface of the shroud and a lower surface of the shroud; and a shielding operably engaged with mounting plate and encapsulating the device on the mounting plate.

2. The shock absorbing apparatus of claim 1, wherein the flexure member is configured to rotationally flex in a first rotational direction and a second rotational direction to absorb ballistic shock forces caused by the ballistic shock event.

3. The shock absorbing apparatus of claim 1, wherein the flexure member comprises:

a central section;

a set of arms extending outwardly from the central section; and a set of extended members extending outwardly from the set of arms;

wherein the set of extended members operably engages with the mounting plate and is spaced apart from the baseplate.

4. The shock absorbing apparatus of claim 3, wherein the flexure member further comprises:

a top surface of the central section spaced apart from the mounting plate;

a bottom surface of the central section vertically opposite to the top surface and that operably engages with the baseplate; and a central axis defined between the top surface and the bottom surface;

wherein when the ballistic shock forces are applied on the mounting plate and the device in directions that are orthogonal to the central axis, the set of arms rotatably flexes between the neutral position and the transition position relative to the central axis.

5. The shock absorbing apparatus of claim 3, wherein each arm of the set of arms comprises:

a first end operably engaging with the central section;

a second end opposite to the first end and configured to engage with an extended member of the set of extended members; and a curved portion extending longitudinally between the first end and the second end;

wherein the curved portion rotatably flexes between the neutral position and the transition position to absorb ballistic shock forces applied on the mounting plate and the device caused by the ballistic shock event.

6. The shock absorbing apparatus of claim 1, further comprising:

a first set of retaining members that operably engages with the baseplate and interfaces with the flexure member for maintaining the flexure member, the mounting plate, and the device in the neutral position in absence of the ballistic shock event.

7. The shock absorbing apparatus of claim 6, wherein the mounting plate comprises:

a top surface;

a bottom surface directly opposite to the top surface;

a set of first interior walls extending upwardly from the bottom surface towards the top surface and defining lower annular recesses; and a set of second interior walls extending upwardly from the set of first interior walls towards the top surface and defining upper chambers;

wherein each retaining member of the first set of retaining members is configured to slidably engage with the set of first interior walls for enabling the mounting plate to move between the neutral position and the translated position.

8. The shock absorbing apparatus of claim 7, wherein each retaining member of the first set of retaining members comprises:

a ball detent that operably engages with the mounting plate; and a spring plunger that interfaces with the ball detent and operably engages with the baseplate;

wherein ball detent is moveable relative to the spring plunger between a first position and a second position for enabling the mounting plate to move between the neutral position and the translated position.

9. The shock absorbing apparatus of claim 8, wherein each retaining member of the first set of retaining members further comprises:

a terminal end of the ball detent;

wherein when the mounting plate is in the neutral position, the terminal end of the ball detent operably engages with the mounting plate and partially positioned inside of an upper chamber of the set of upper chambers; and wherein when the mounting plate is in the translated position, the terminal end of the ball detent operably engages with the mounting plate external to the upper chamber of the set of upper chambers.

10. The shock absorbing apparatus of claim 7, further comprising:

a central retaining member that operably engages with the flexure member and interfaces with the mounting plate to maintain the mounting plate and the device in the neutral position in absence of the ballistic shock event.

11. The shock absorbing apparatus of claim 10, wherein the central retaining member comprises:

a ball detent that operably engages with the mounting plate; and a spring plunger that interfaces with the ball detent and operably engages with the baseplate;

wherein ball detent is moveable relative to the spring plunger between a first position and a second position for enabling the mounting plate to move between the neutral position and the translated position.

12. The shock absorbing apparatus of claim 11, wherein the central retaining member further comprises:

a terminal end of the ball detent;

wherein when the mounting plate is in the neutral position, the terminal end of the ball detent operably engages with the mounting plate and partially positioned inside of an upper chamber of the set of upper chambers; and wherein when the mounting plate is in the translated position, the terminal end of the ball detent operably engages with the mounting plate external to the upper chamber of the set of upper chambers.

13. A method, comprising:

providing a shock absorbing apparatus, wherein the shock absorbing apparatus comprises:

a baseplate;

a flexure member operably engaging with the baseplate; and a mounting plate operably engaging with the flexure member, wherein the mounting plate is free from engagement with the baseplate and moveable between a neutral position and a translated position with respect to the baseplate;

effecting the baseplate, the flexure member, the mounting plate, and a device operably engaged with the mounting plate to be mounted to a platform;

effecting a first dampening force to be exerted on the mounting plate and the device, via the flexure member, in a first direction in response to a ballistic event;

effecting an opposing second dampening force to be exerted on the mounting plate and the device, via the flexure member, in an opposing second direction;

effecting the mounting plate and the device to be maintained at a neutral position subsequent to the ballistic event; and engaging a spring plunger of each retaining member of a set of retaining members of the shock absorbing apparatus with the baseplate; and engaging a ball detent of each retaining member of the set of retaining members with the mounting plate inside a set of engagement cavities defined by mounting plate without a response to the ballistic event;

wherein the mounting plate is maintained at the neutral position.

14. The method of claim 13, wherein the step of effecting a first absorbing force to be exerted on the mounting plate and the device via the flexure member further comprises:

rotating the flexure member in a first rotational direction from the neutral position to the translated position in response to the ballistic event.

15. The method of claim 13, wherein the step of effecting a second absorbing force to be exerted on the mounting plate and the device via the flexure member further comprises:

rotating the flexure member in a second rotational direction from the translated position to the neutral position in response to the ballistic event.

16. The method of claim 13, further comprising:

disengaging the ball detent of each retaining member of the set of retaining members from the mounting plate outside of the set of engagement cavities in response to the ballistic event;

wherein the mounting plate translates from the neutral position to the translated position.

17. The method of claim 13, further comprising:

engaging a shroud of the shock absorbing apparatus with the baseplate and the mounting plate; and engaging a shielding of the shock absorbing apparatus with the mounting plate;

wherein the shroud protects the flexure member from external elements surrounding the shock absorbing apparatus;

wherein the shielding protects the device on the mounting plate.

18. A shock absorbing apparatus, comprising:

a baseplate adapted to be mounted on a platform;

a flexure member operably engaging with the baseplate; and a mounting plate operably engaging with the flexure member, wherein the mounting plate is free from direct engagement with the baseplate and moveable between a neutral position and a translated position with respect to the baseplate, and wherein the mounting plate is adapted to hold a device;

wherein the flexure member is adapted to absorb shock forces caused by a projectile motion event in proximity to or applied on the platform; and wherein the mounting plate comprises:

a top surface;

a bottom surface directly opposite to the top surface;

a set of first interior walls extending upwardly from the bottom surface towards the top surface and defining lower annular recesses; and a set of second interior walls extending upwardly from the set of first interior walls towards the top surface and defining upper chambers;

wherein each retaining member of the first set of retaining members is configured to slidably engage with the set of first interior walls for enabling the mounting plate to move between the neutral position and the translated position.

\* \* \* \* \*